US012437355B2

(12) United States Patent
Daxer et al.

(10) Patent No.: US 12,437,355 B2
(45) Date of Patent: Oct. 7, 2025

(54) GRANULAR GPU DVFS WITH EXECUTION UNIT PARTIAL POWERDOWN

(71) Applicant: Intel Corporation, Santa Clara, CA (US)

(72) Inventors: Kenneth Daxer, Sunnyvale, CA (US); Stephen H. Gunther, Beaverton, OR (US); Michael N. Derr, El Dorado Hills, CA (US); Eric Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 18/340,139

(22) Filed: Jun. 23, 2023

(65) Prior Publication Data

US 2023/0334613 A1 Oct. 19, 2023

Related U.S. Application Data

(63) Continuation of application No. 18/185,008, filed on Mar. 16, 2023.

(60) Provisional application No. 63/321,726, filed on Mar. 20, 2022, provisional application No. 63/321,725, filed on Mar. 20, 2022.

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC ...... G06F 1/324; G06F 1/2303; G06F 1/3296; G06F 1/3287; G06T 1/20; G06T 1/60
USPC ................................. 713/324; 345/502, 522
See application file for complete search history.

(56) References Cited

U.S. PATENT DOCUMENTS

| 9,916,636 | B2 * | 3/2018 | Li | G06T 1/20 |
| 10,186,011 | B2 * | 1/2019 | Nurvitadhi | G06N 3/063 |
| 10,359,834 | B2 | 7/2019 | Maiyuran et al. | |
| 2019/0228560 | A1 * | 7/2019 | Wald | G06T 15/005 |
| 2022/0291955 | A1 * | 9/2022 | Mrozek | H04L 1/18 |

* cited by examiner

*Primary Examiner* — Brian T Misiura
(74) *Attorney, Agent, or Firm* — Jaffery Watson Hamilton & DeSanctis LLP

(57) ABSTRACT

Described herein, in one embodiment, is a graphics processor comprising a plurality of dies integrated in a package, at least one die of the plurality of dies functionally heterogeneous relative to at least one other die of the plurality of dies and manufactured with a different process technology than the at least one other die.

24 Claims, 27 Drawing Sheets

GRANULAR GPU DVFS WITH EXECUTION UNIT PARTIAL POWERDOWN

CROSS-REFERENCE

The present patent application is a continuation of U.S. application Ser. No. 18/185,008, filed Mar. 16, 2023, which claims priority from U.S. Provisional Application No. 63/321,725 and U.S. Provisional Application No. 63/321,726, filed Mar. 20, 2022, the contents of which are incorporated herein by reference in their entirety.

FIELD

Embodiments described herein generally relate to efficiency and energy conservation in integrated circuits. More particularly, embodiments relate to balancing power and performance between processing elements of general-purpose graphics and parallel processing units.

BACKGROUND OF THE DISCLOSURE

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems have also escalated. Particularly in the field of graphics processors, power requirements have begun to stress the power delivery ability of the power supplies typically found in consumer computing systems.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Described herein is a chiplet architecture that enables late bind SKU fungibility that allows IP for a product to be determined later in the design process, enabling a more fungible and nimble product architecture. The chiplet architecture can employ an array of functionality and physically homogenous or heterogeneous chiplets to implement a variety processing designs, from a general-purpose processor (e.g., central processing units (CPU)), graphics processing unit (GPU), parallel compute accelerator, and/or general-purpose graphics processing unit (GPGPU).

Also described is a chunking architecture in which multiple heterogenous or homogenous chiplets are grouped into a chunk of physically contiguous chiplets. The chunking architecture enables homogenous chiplets with different execution core counts to be grouped into chunks of chiplets, where each chunk of chiplets has a uniform number of execution cores. The chunking architecture also enables heterogenous chiplets with different power requirements to be grouped into chunks that have uniform or pre-determined power delivery requirements. Power delivery can then be configured on a per-chunk instead of a per-chiplet basis.

The processes depicted in the figures that follow can be performed by processing logic that comprises hardware (e.g., circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

System Overview

Figure 1:
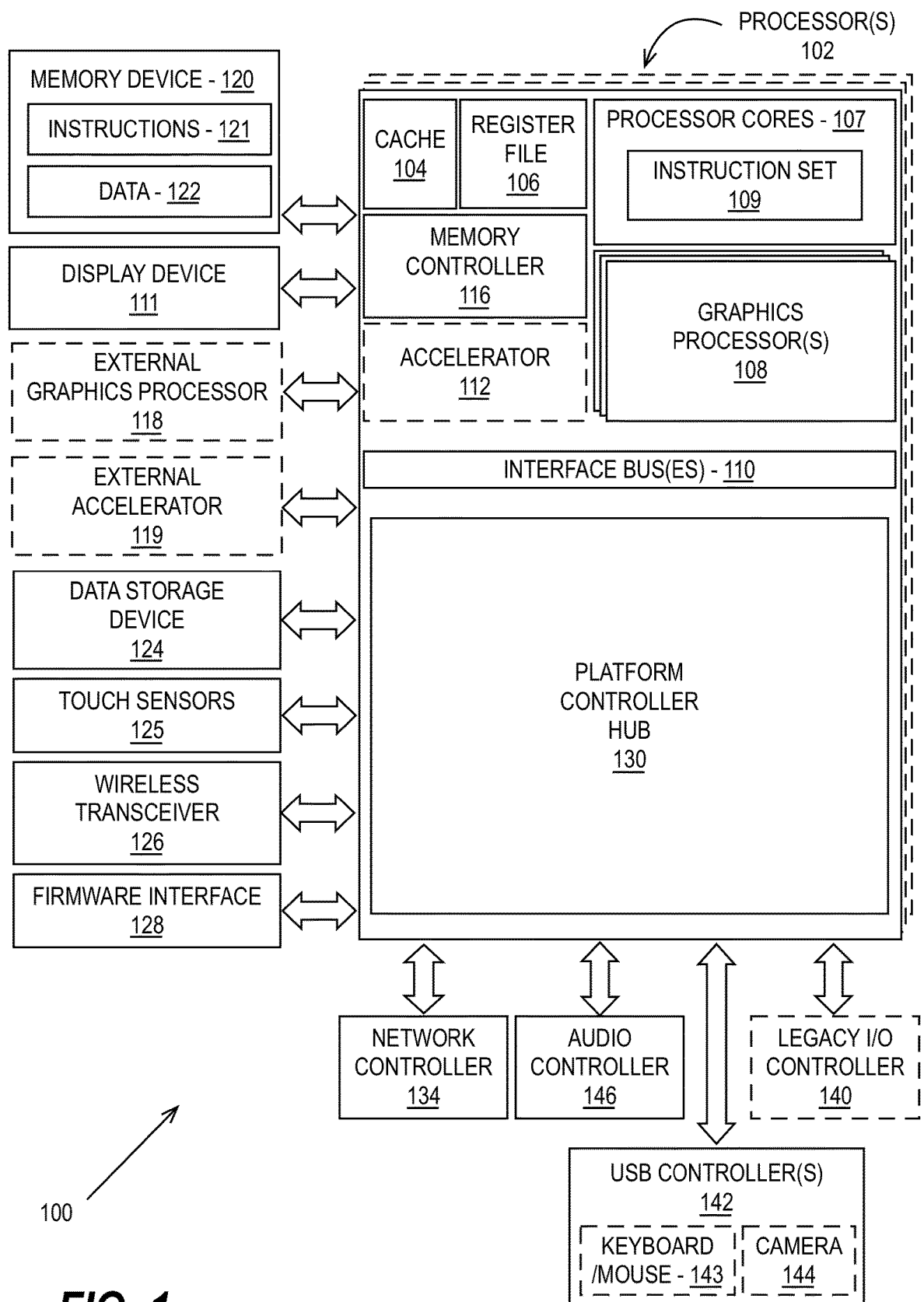
FIG. 1 is a block diagram of a processing system, according to an embodiment.

FIG. 1 is a block diagram of a processing system 100, according to an embodiment. Processing system 100 may be used in a single processor desktop system, a multiprocessor workstation system, or a server system having a large number of processors 102 or processor cores 107. In one embodiment, the processing system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 100 can include, couple with, or be integrated within: a server-based gaming platform; a game console, including a game and media console; a mobile gaming console, a handheld game console, or an online game console. In some embodiments the processing system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, processing system 100 can include, couple with, or be integrated within a self-driving vehicle such as a bus, tractor trailer, car, motor or electric power cycle, plane, or glider (or any combination thereof). The self-driving vehicle may use processing system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the processing system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include a memory controller 116 and a platform controller hub 130. The memory controller 116 facilitates communication between a memory device and other components of the processing system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the processing system 100, to store data 122 and instructions 121 for use when the one or more processors 102 executes an application or process. The memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray tracing accelerator that can be used to perform ray tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high-definition audio controller. In one embodiment the processing system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the processing system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102 and reside in a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIG. 2A-2D illustrate computing systems and graphics processors provided by embodiments described herein. The elements of FIG. 2A-2D having the same reference numbers (or names) as the elements of any other figure herein can operate or function in any manner similar to that described elsewhere herein but are not limited to such.

Figure 2A:
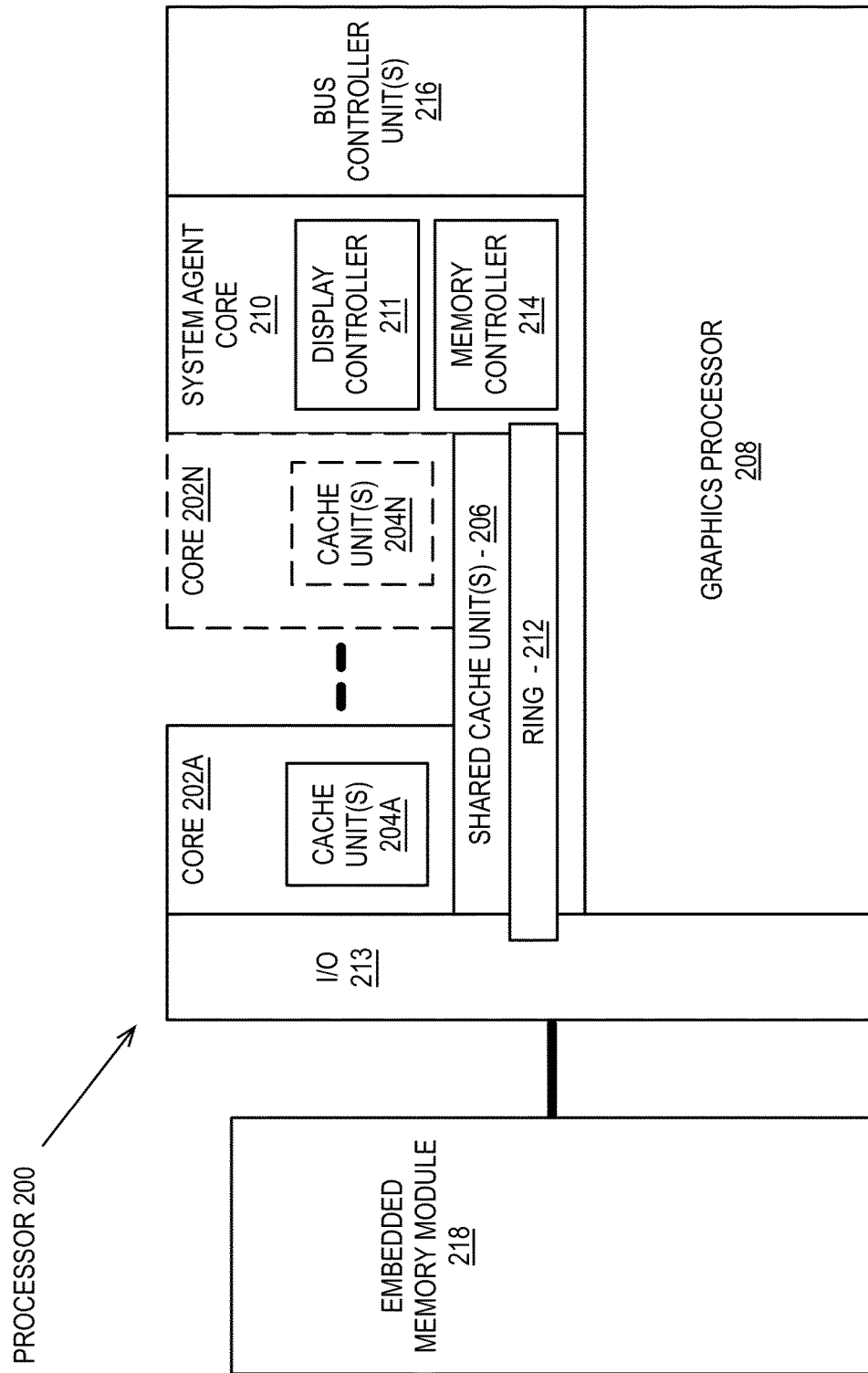
FIG. 2A-2D illustrate computing systems and graphics processors provided by embodiments described herein.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect or may be integrated within the graphics processor 208.

In some embodiments, a ring-based interconnect 212 is used to couple the internal components of the processor 200. However, an alternative interconnect unit may be used, such as a point-to-point interconnect, a switched interconnect, a mesh interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module or a high-bandwidth memory (HBM) module. In some embodiments, each of the processor cores 202A-202N and graphics processor 208 can use the embedded memory module 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
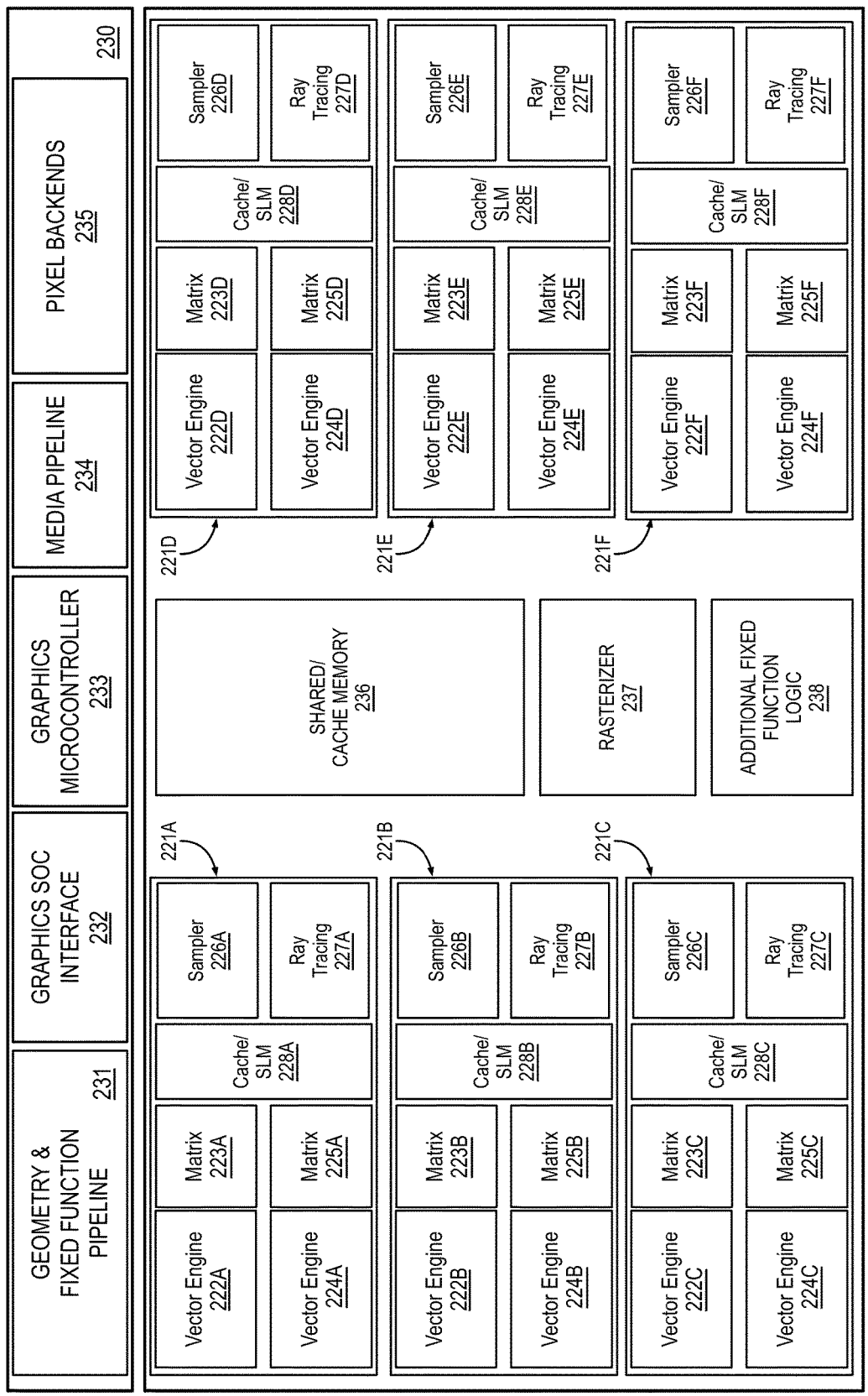

FIG. 2B is a block diagram of hardware logic of a graphics processor core block 219, according to some embodiments described herein. In some embodiments, elements of FIG. 2B having the same reference numbers (or names) as the elements of any other figure herein may operate or function in a manner similar to that described elsewhere herein. The graphics processor core block 219 is exemplary of one partition of a graphics processor. The graphics processor core block 219 can be included within the integrated graphics processor 208 of FIG. 2A or a discrete graphics processor, parallel processor, and/or compute accelerator. A graphics processor as described herein may include multiple graphics core blocks based on target power and performance envelopes. Each graphics processor core block 219 can include a function block 230 coupled with multiple graphics cores 221A-221F that include modular blocks of fixed function logic and general-purpose programmable logic. The graphics processor core block 219 also includes shared/cache memory 236 that is accessible by all graphics cores 221A-221F, rasterizer logic 237, and additional fixed function logic 238.

In some embodiments, the function block 230 includes a geometry/fixed function pipeline 231 that can be shared by all graphics cores in the graphics processor core block 219. In various embodiments, the geometry/fixed function pipeline 231 includes a 3D geometry pipeline a video front-end unit, a thread spawner and global thread dispatcher, and a unified return buffer manager, which manages unified return buffers. In one embodiment the function block 230 also includes a graphics SoC interface 232, a graphics microcontroller 233, and a media pipeline 234. The graphics SoC interface 232 provides an interface between the graphics processor core block 219 and other core blocks within a graphics processor or compute accelerator SoC. The graphics microcontroller 233 is a programmable sub-processor that is configurable to manage various functions of the graphics processor core block 219, including thread dispatch, scheduling, and pre-emption. The media pipeline 234 includes logic to facilitate the decoding, encoding, pre-processing, and/or post-processing of multimedia data, including image and video data. The media pipeline 234 implement media operations via requests to compute or sampling logic within the graphics cores 221-221F. One or more pixel backends 235 can also be included within the function block 230. The pixel backends 235 include a cache memory to store pixel color values and can perform blend operations and lossless color compression of rendered pixel data.

In one embodiment the graphics SoC interface 232 enables the graphics processor core block 219 to communicate with general-purpose application processor cores (e.g., CPUs) and/or other components within an SoC or a system host CPU that is coupled with the SoC via a peripheral interface. The graphics SoC interface 232 also enables communication with off-chip memory hierarchy elements such as a shared last level cache memory, system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core block 219 and CPUs within the SoC. The graphics SoC interface 232 can also implement power management controls for the graphics processor core block 219 and enable an interface between a clock domain of the graphics processor core block 219 and other clock domains within the SoC. In one embodiment the graphics SoC interface 232 enables receipt of command buffers from a command streamer and global thread dispatcher that are configured to provide commands and instructions to each of one or more graphics cores within a graphics processor. The commands and instructions can be dispatched to the media pipeline 234 when media operations are to be performed, the geometry and fixed function pipeline 231 when graphics processing operations are to be performed. When compute operations are to be performed, compute dispatch logic can dispatch the commands to the graphics cores 221A-221F, bypassing the geometry and media pipelines.

The graphics microcontroller 233 can be configured to perform various scheduling and management tasks for the graphics processor core block 219. In one embodiment the graphics microcontroller 233 can perform graphics and/or compute workload scheduling on the various vector engines 222A-222F, 224A-224F and matrix engines 223A-223F, 225A-225F within the graphics cores 221A-221F. In this scheduling model, host software executing on a CPU core of an SoC including the graphics processor core block 219 can submit workloads one of multiple graphics processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core block 219, providing the graphics processor core block 219 with the ability to save and restore registers within the graphics processor core block 219 across low-power state transitions independently from the operating system and/or graphics driver software on the system.

The graphics processor core block 219 may have greater than or fewer than the illustrated graphics cores 221A-221F, up to N modular graphics cores. For each set of N graphics cores, the graphics processor core block 219 can also include shared/cache memory 236, which can be configured as shared memory or cache memory, rasterizer logic 237, and additional fixed function logic 238 to accelerate various graphics and compute processing operations.

Within each of the graphics cores 221A-221F is set of execution resources that may be used to perform graphics, media, and compute operations in response to requests by graphics pipeline, media pipeline, or shader programs. The graphics cores 221A-221F include multiple vector engines 222A-222F, 224A-224F, matrix acceleration units 223A-223F, 225A-225D, cache/shared local memory (SLM), a sampler 226A-226F, and a ray tracing unit 227A-227F.

The vector engines 222A-222F, 224A-224F are general-purpose graphics processing units capable of performing floating-point and integer/fixed-point logic operations in service of a graphics, media, or compute operation, including graphics, media, or compute/GPGPU programs. The vector engines 222A-222F, 224A-224F can operate at variable vector widths using SIMD, SIMT, or SIMT+SIMD execution modes. The matrix acceleration units 223A-223F, 225A-225D include matrix-matrix and matrix-vector acceleration logic that improves performance on matrix operations, particularly low and mixed precision (e.g., INT8, FP16, BF16) matrix operations used for machine learning. In one embodiment, each of the matrix acceleration units 223A-223F, 225A-225D includes one or more systolic arrays of processing elements that can perform concurrent matrix multiply or dot product operations on matrix elements.

The sampler 226A-22F can read media or texture data into memory and can sample data differently based on a configured sampler state and the texture/media format that is being read. Threads executing on the vector engines 222A-222F, 224A-224F or matrix acceleration units 223A-223F, 225A-225D can make use of the cache/SLM 228A-228F within each execution core. The cache/SLM 228A-228F can be configured as cache memory or as a pool of shared memory that is local to each of the respective graphics cores 221A-221F. The ray tracing units 227A-227F within the graphics cores 221A-221F include ray traversal/intersection circuitry for performing ray traversal using bounding volume hierarchies (BVHs) and identifying intersections between rays and primitives enclosed within the BVH volumes. In one embodiment the ray tracing units 227A-227F include circuitry for performing depth testing and culling (e.g., using a depth buffer or similar arrangement). In one implementation, the ray tracing units 227A-227F perform traversal and intersection operations in concert with image denoising, at least a portion of which may be performed using an associated matrix acceleration unit 223A-223F, 225A-225D.

Figure 2C:
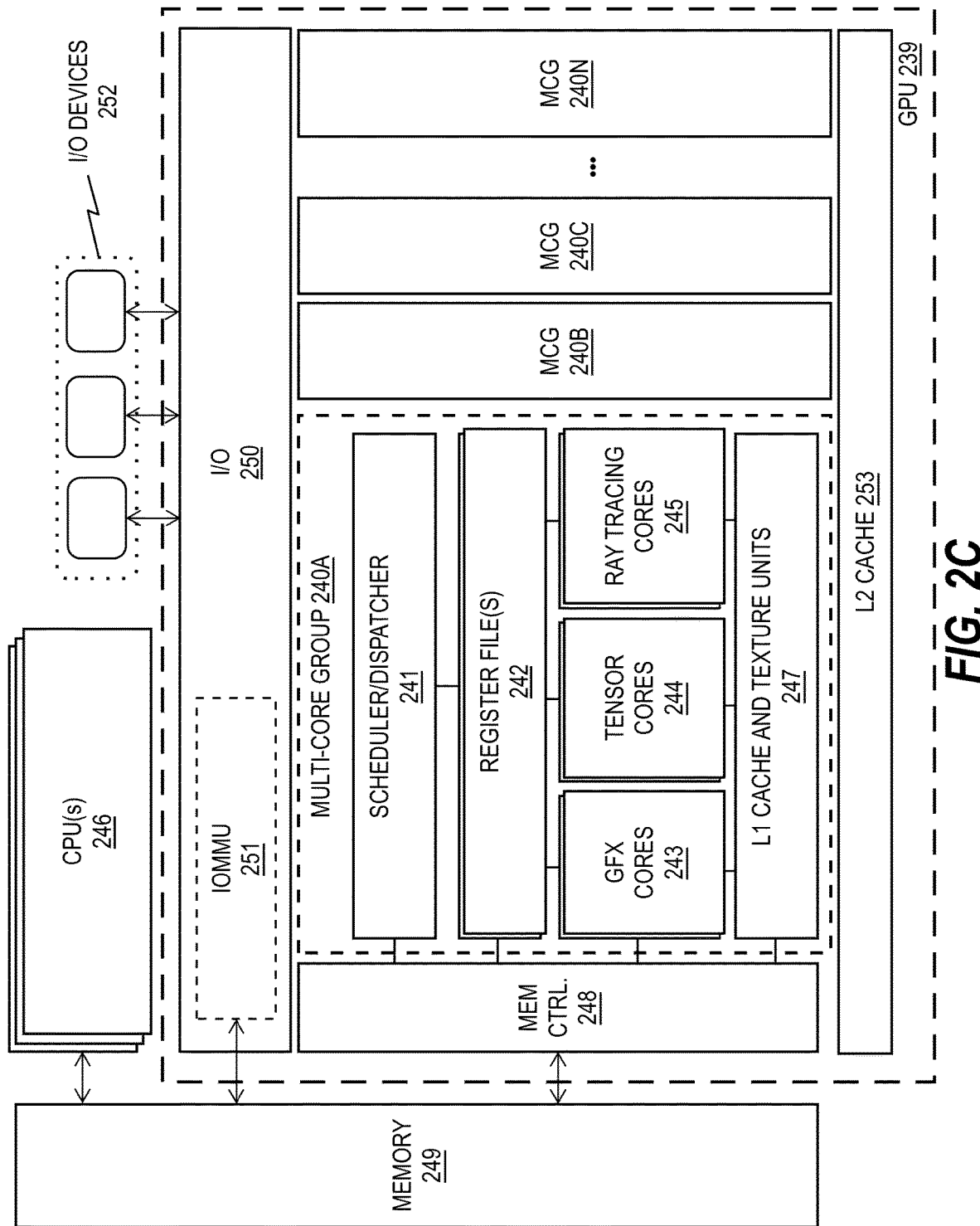

FIG. 2C illustrates a graphics processing unit (GPU) 239 that includes dedicated sets of graphics processing resources arranged into multi-core groups 240A-240N. The details of multi-core group 240A are illustrated. Multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. In one embodiment the tensor cores 244 are sparse tensor cores with hardware to enable multiplication operations having a zero-value input to be bypassed. The graphics cores 243 of the GPU 239 of FIG. 2C differ in hierarchical abstraction level relative to the graphics cores 221A-221F of FIG. 2B, which are analogous to the multi-core groups 240A-240N of FIG. 2C. The graphics cores 243, tensor cores 244, and ray tracing cores 245 of FIG. 2C are analogous to, respectively, the vector engines 222A-222F, 224A-224F, matrix engines 223A-223F, 225A-225F, and ray tracing units 227A-227F of FIG. 2B.

A set of register files 242 can store operand values used by the cores 243, 244, 245 when executing the graphics threads. These may include, for example, integer registers for storing integer values, floating point registers for storing floating point values, vector registers for storing packed data elements (integer and/or floating-point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the memory 249. In one embodiment, the IOMMU 251 manages multiple sets of page tables to map virtual addresses to physical addresses in memory 249. In this embodiment, the I/O devices 252, CPU(s) 246, and GPU 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPU(s) 246, GPU 239, and I/O devices 252 are integrated on a single semiconductor chip and/or chip package. The memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the embodiments described herein are not limited to this specific implementation.

In one embodiment, the tensor cores 244 include a plurality of functional units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high-speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the embodiments described herein are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per—primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the child volumes a ray will traverse.

Exceptions—Includes various types of exception handlers (e.g., invoked for various error conditions).

In one embodiment the ray tracing cores 245 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 245 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray tracing analogies.

Ray tracing cores 245 can also be used to perform computations that are not directly analogous to ray tracing. For example, mesh projection, mesh refinement, and volume sampling computations can be accelerated using the ray tracing cores 245. Generic coordinate space calculations, such as nearest neighbor calculations can also be performed. For example, the set of points near a given point can be discovered by defining a bounding box in the coordinate space around the point. BVH and ray probe logic within the ray tracing cores 245 can then be used to determine the set of point intersections within the bounding box. The intersections constitute the origin point and the nearest neighbors to that origin point. Computations that are performed using the ray tracing cores 245 can be performed in parallel with computations performed on the graphics cores 243 and tensor cores 244. A shader compiler can be configured to compile a compute shader or other general-purpose graphics processing program into low level primitives that can be parallelized across the graphics cores 243, tensor cores 244, and ray tracing cores 245.

Figure 2D:
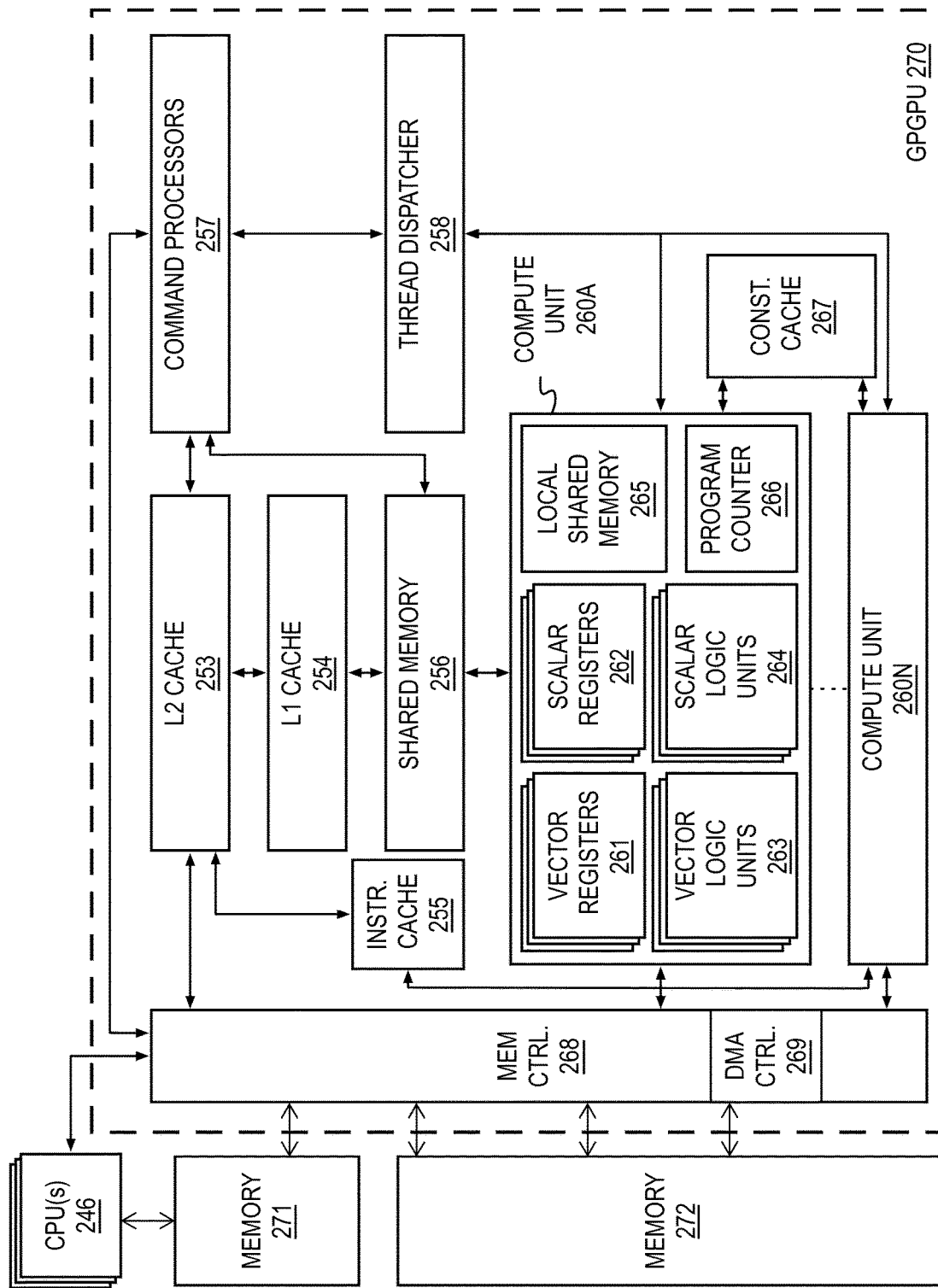

FIG. 2D is a block diagram of general-purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N, which represent a hierarchical abstraction level analogous to the graphics cores 221A-221F of FIG. 2B and the multi-core groups 240A-240N of FIG. 2C. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
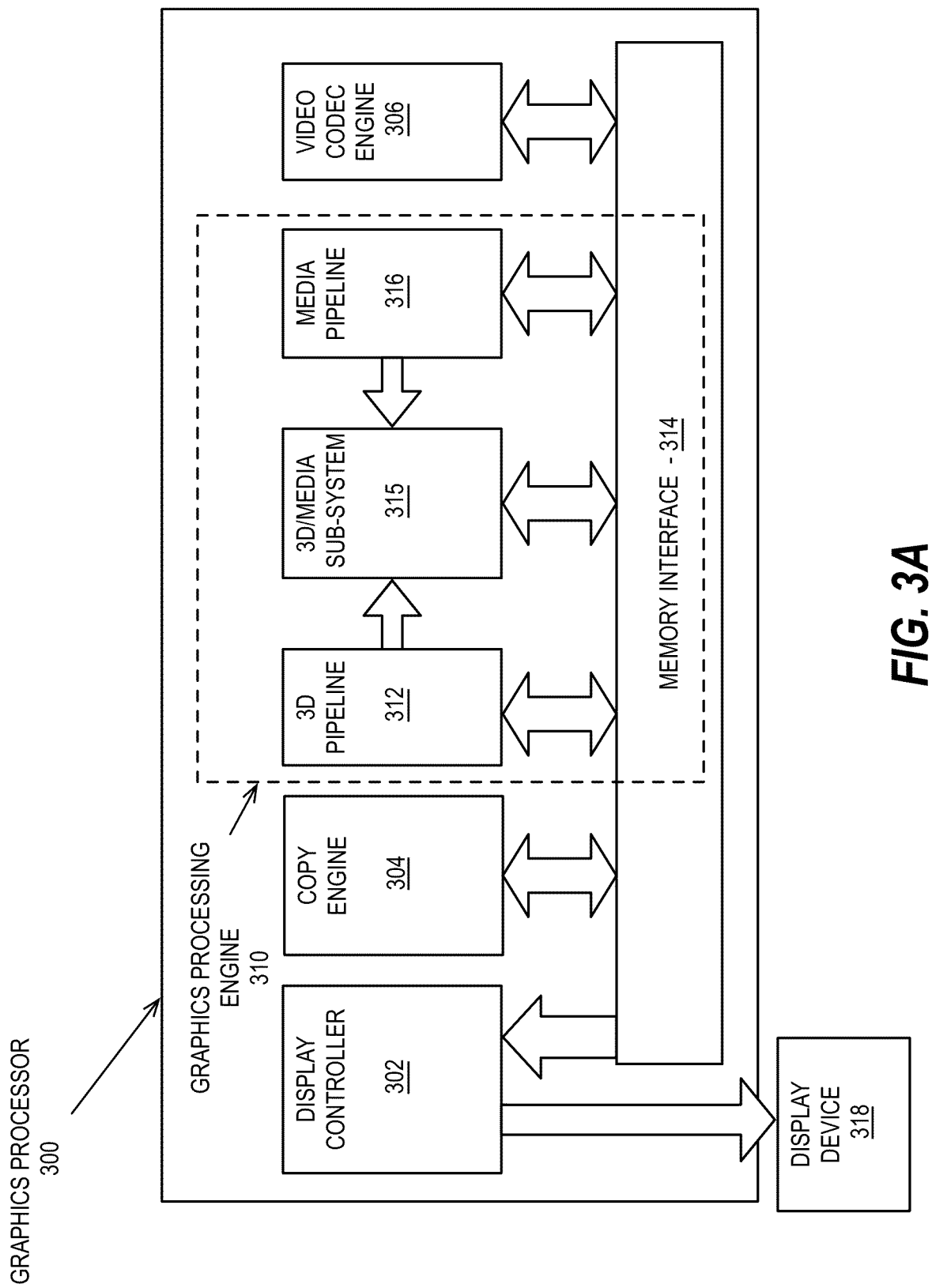
FIG. 3A-3C illustrate block diagrams of additional graphics processor and compute accelerator architectures provided by embodiments described herein.
Figure 3B:
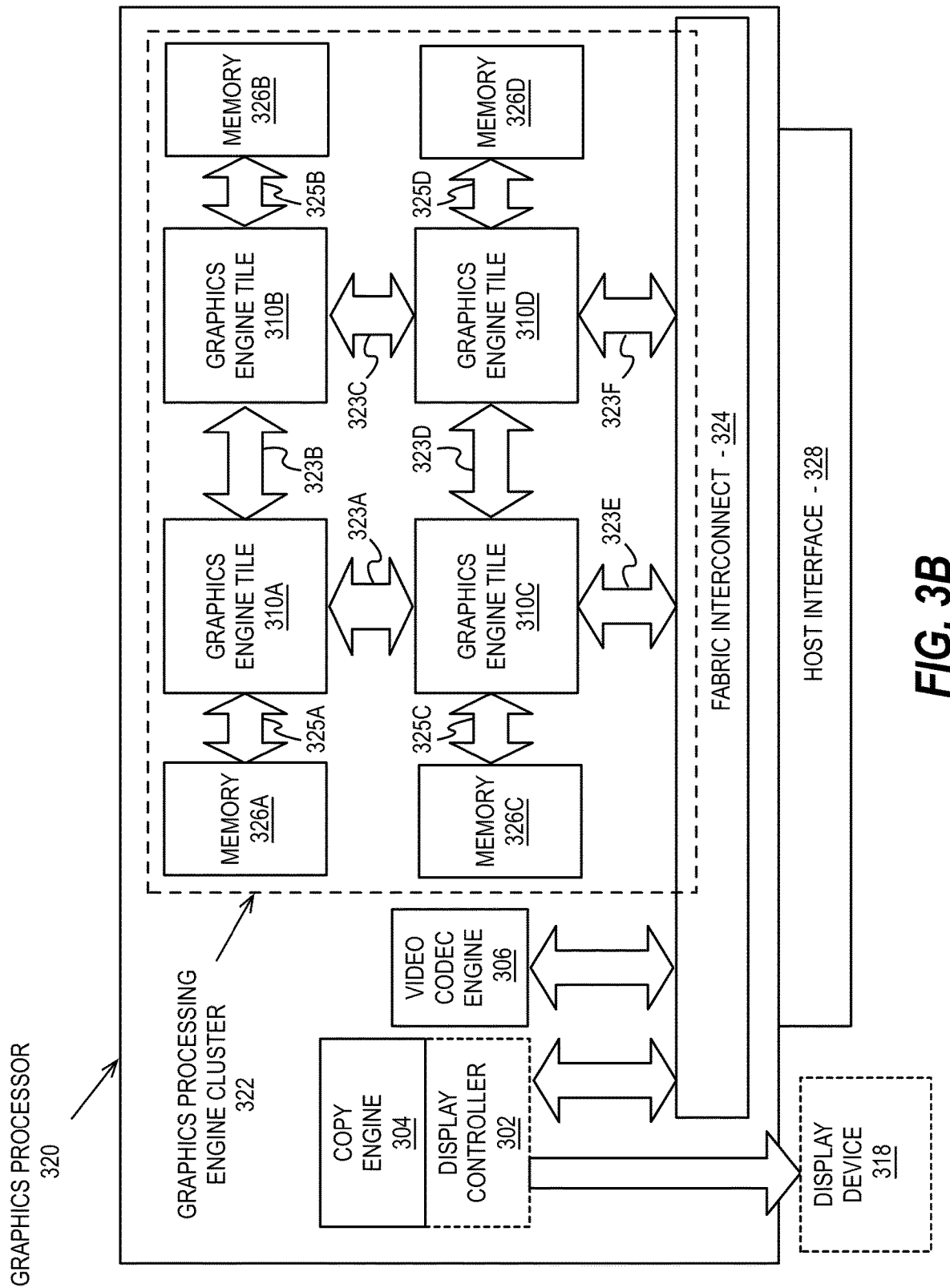
Figure 3C:
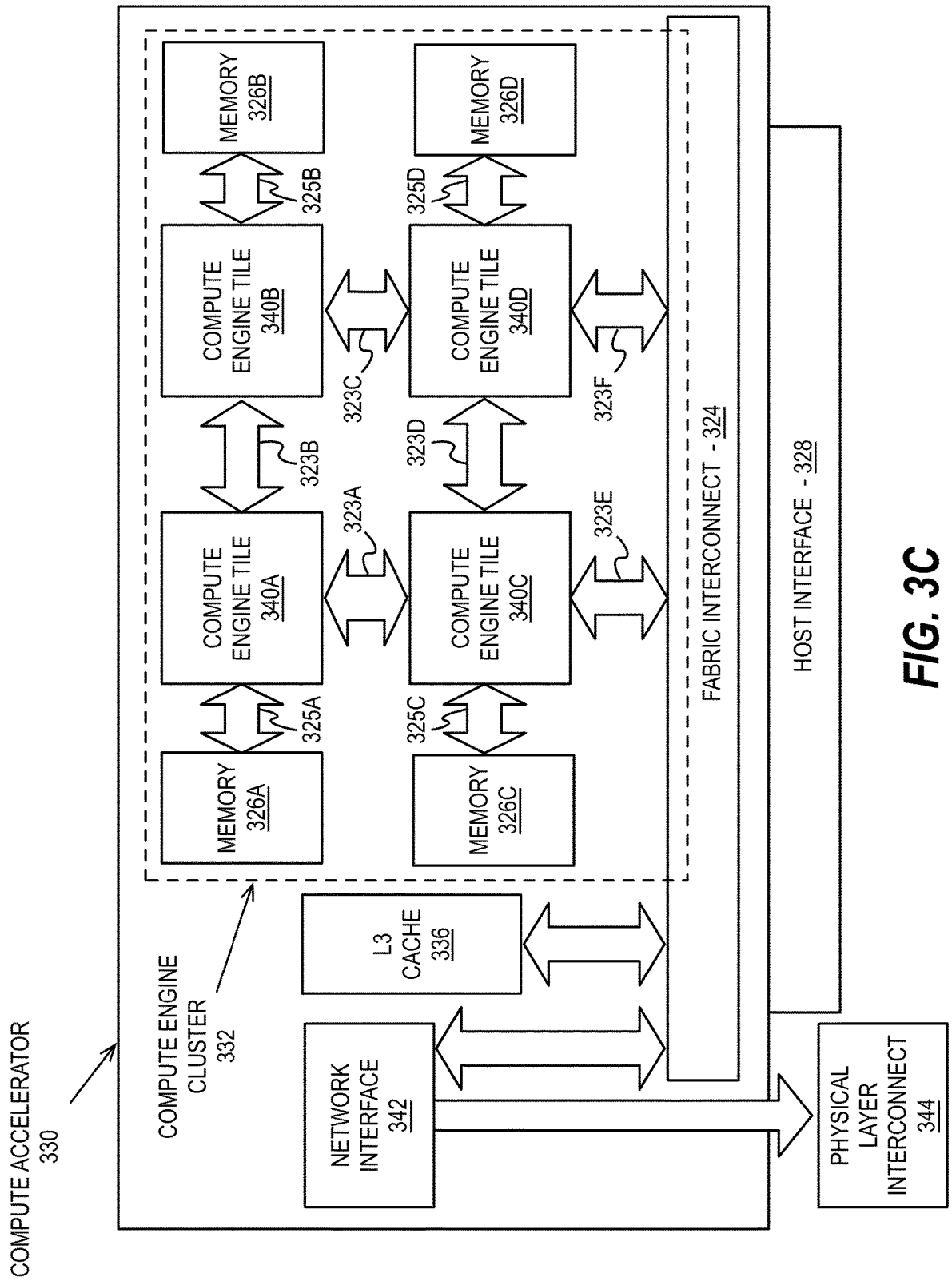

FIG. 3A-3C illustrate block diagrams of additional graphics processor and compute accelerator architectures provided by embodiments described herein. The elements of FIG. 3A-3C having the same reference numbers (or names) as the elements of any other figure herein can operate or function in any manner similar to that described elsewhere herein but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE 310). In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media subsystem 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media subsystem 315. The spawned threads perform computations for the media operations on one or more graphics cores included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics cores to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the GPE 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are HBM modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIG. 12B-12D.

The graphics processor 320 may be configured with a non-uniform memory access (NUMA) systemin which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to maintain a consistent memory image when more than one cache stores the same memory location.

The graphics processing engine cluster 322 can connect with an on-chip or on-package fabric interconnect 324. In one embodiment the fabric interconnect 324 includes a network processor, network on a chip (NoC), or another switching processor to enable the fabric interconnect 324 to act as a packet switched fabric interconnect that switches data packets between components of the graphics processor 320. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also couple with one or more of the tile interconnects 323A-323F to facilitate or enhance the interconnection between the graphics engine tiles 310A-310D. The fabric interconnect 324 is also configurable to interconnect multiple instances of the graphics processor 320 (e.g., via the host interface 328), enabling tile-to-tile communication between graphics engine tiles 310A-310D of multiple GPUs. In one embodiment, the graphics engine tiles 310A-310D of multiple GPUs can be presented to a host system as a single logical device.

The graphics processor 320 may optionally include a display controller 302 to enable a connection with the display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface. For example, the host interface 328 may be an NVLink or NVSwitch interface. The host interface 328 and fabric interconnect 324 can cooperate to enable multiple instances of the graphics processor 320 to act as single logical device. Cooperation between the host interface 328 and fabric interconnect 324 can also enable the individual graphics engine tiles 310A-310D to be presented to the host system as distinct logical graphics devices.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320 or can be different. The graphics compute engine tiles 340A-340D can also be interconnected via a set of tile interconnects 323A-323F and may be connected with and/or interconnected by a fabric interconnect 324. Cross-tile communications can be facilitated via the fabric interconnect 324. The fabric interconnect 324 (e.g., via the host interface 328) can also facilitate communication between compute engine tiles 340A-340D of multiple instances of the compute accelerator 330. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

The compute accelerator 330 can also include an integrated network interface 342. In one embodiment the network interface 342 includes a network processor and controller logic that enables the compute engine cluster 332 to communicate over a physical layer interconnect 344 without requiring data to traverse memory of a host system. In one embodiment, one of the compute engine tiles 340A-340D is replaced by network processor logic and data to be transmitted or received via the physical layer interconnect 344 may be transmitted directly to or from memory 326A-326D. Multiple instances of the compute accelerator 330 may be joined via the physical layer interconnect 344 into a single logical device. Alternatively, the various compute engine tiles 340A-340D may be presented as distinct network accessible compute accelerator devices.

Graphics Processing Engine

Figure 4:
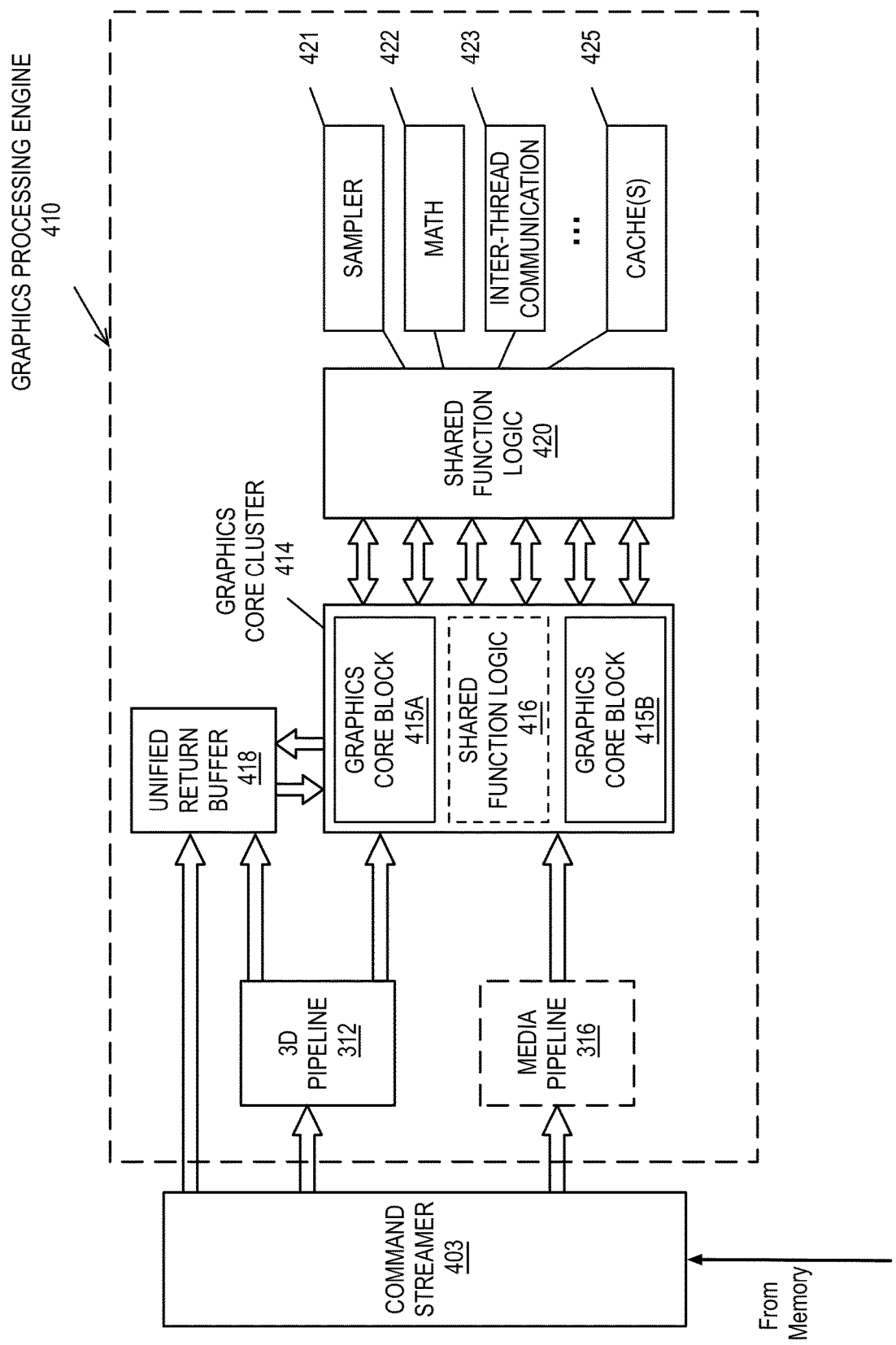
FIG. 4 is a block diagram of a graphics processing engine of a graphics processor in accordance with some embodiments.

FIG. 4 is a block diagram of a graphics processing engine of a graphics processor in accordance with some embodiments. In one embodiment, the graphics processing engine (GPE 410) is a version of the GPE 310 shown in FIG. 3A and may also represent a graphics engine tile 310A-310D of FIG. 3B. Elements of FIG. 4 having the same reference numbers (or names) as the elements of any other figure herein can operate or function in any manner similar to that described elsewhere herein but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. Alternatively or additionally, the command streamer 403 may be directly coupled to a unified return buffer (URB 418). The URB 418 may be communicatively coupled to a graphics core cluster 414. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core cluster 414. In one embodiment the graphics core cluster 414 include one or more blocks of graphics cores (e.g., graphics core block 415A, graphics core block 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic, such as matrix or AI acceleration logic. Graphics cores within each graphics core block 415A, 415B can be interconnected via a core interconnect network to enable the graphics cores 515A-515N to share data between cooperatively executing threads within a graphics core block. In one embodiment, the core interconnect network is additionally configured to interconnect graphics core blocks 415A-415B and their associated graphics cores.

In various embodiments the 3D pipeline 312 can include fixed function and programmable logic to process one or more shader programs, such as vertex shaders, geometry shaders, pixel shaders, fragment shaders, compute shaders, or other shader and/or GPGPU programs, by processing the instructions and dispatching execution threads to the graphics core cluster 414. The graphics core cluster 414 provides a unified block of execution resources for use in processing these shader programs. Multi-purpose execution logic within the graphics core blocks 415A-415B of the graphics core cluster 414 includes support for various 3D API shader languages and can execute multiple simultaneous execution threads associated with multiple shaders.

In some embodiments, the graphics core cluster 414 includes execution logic to perform media functions, such as video and/or image processing. In one embodiment, the graphics cores include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core cluster 414 can output data to memory to the URB 418. The URB 418 can store data for multiple threads. In some embodiments the URB 418 may be used to send data between different threads executing on the graphics core cluster 414. In some embodiments the URB 418 may additionally be used for synchronization between threads on the graphics core array and fixed function logic within the shared function logic 420.

In some embodiments, graphics core cluster 414 is scalable, such that the cluster includes a variable number of graphics cores, each having a variable number of graphics cores based on the target power and performance level of the GPE 410. In one embodiment the execution resources are dynamically scalable, such that execution resources may be enabled or disabled as needed.

The graphics core cluster 414 couples with shared function logic 420 that includes multiple resources that are shared between the graphics cores in the graphics core array. The shared functions within the shared function logic 420 are hardware logic units that provide specialized supplemental functionality to the graphics core cluster 414. In various embodiments, shared function logic 420 may include, but is not limited to sampler 421, math 422, and inter-thread communication (ITC) 423 logic. Additionally, some embodiments implement one or more cache(s) 425 within the shared function logic 420. The shared function logic 420 can implement the same or similar functionality as the additional fixed function logic 238 of FIG. 2B.

A shared function is implemented at least in a case where the demand for a given specialized function is insufficient for inclusion within the graphics core cluster 414. Instead, a single instantiation of that specialized function is implemented as a stand-alone entity in the shared function logic 420 and shared among the execution resources within the graphics core cluster 414. The precise set of functions that are shared between the graphics core cluster 414 and included within the graphics core cluster 414 varies across embodiments. In some embodiments, specific shared functions within the shared function logic 420 that are used extensively by the graphics core cluster 414 may be included within shared function logic 416 within the graphics core cluster 414. In various embodiments, the shared function logic 416 within the graphics core cluster 414 can include some or all logic within the shared function logic 420. In one embodiment, all logic elements within the shared function logic 420 may be duplicated within the shared function logic 416 of the graphics core cluster 414. In one embodiment the shared function logic 420 is excluded in favor of the shared function logic 416 within the graphics core cluster 414.

Graphics Processing Resources

Figure 5A:
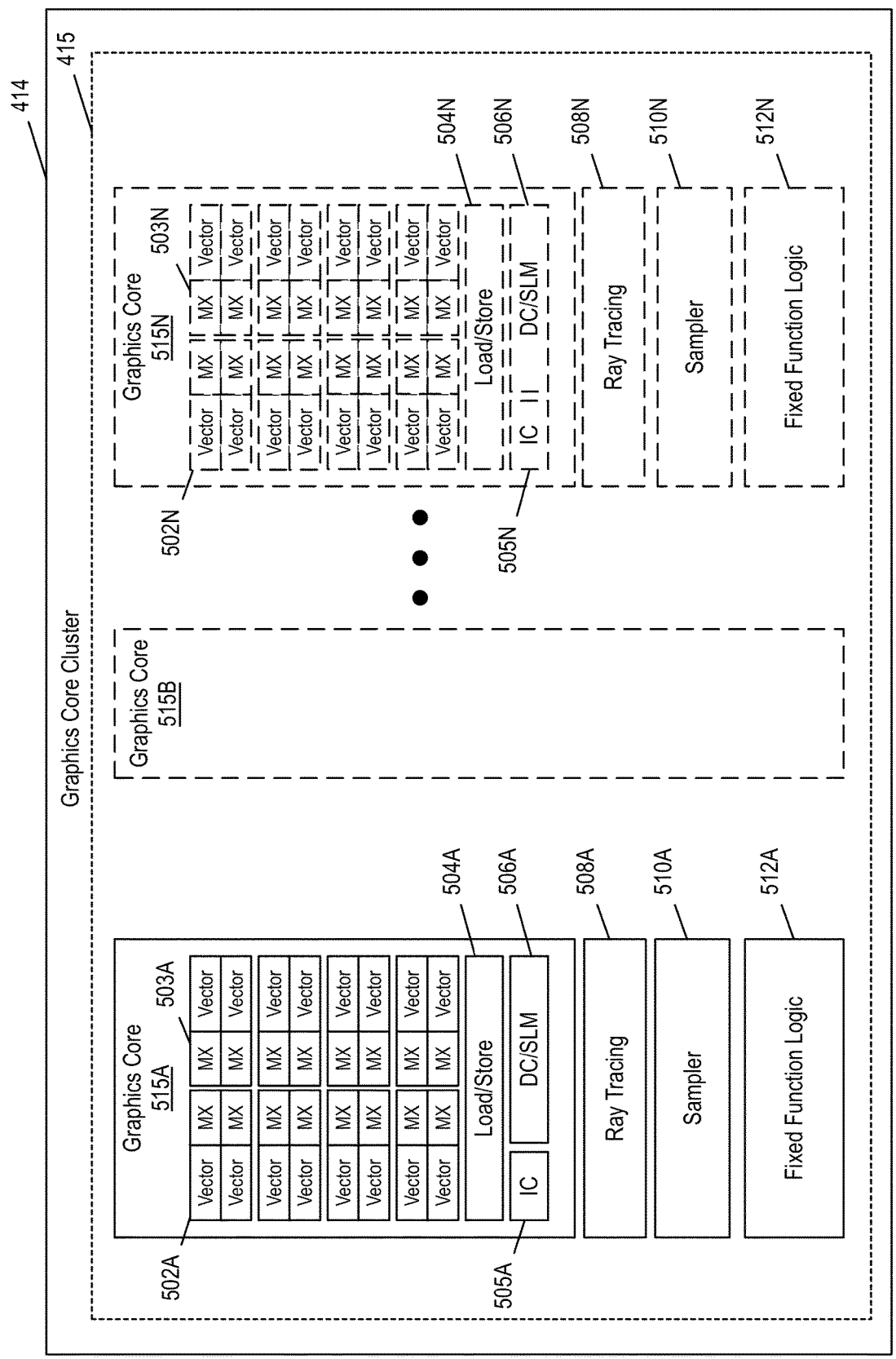
FIG. 5A-5C illustrate thread execution logic including an array of processing elements employed in a graphics processor core according to embodiments.
Figure 5B:
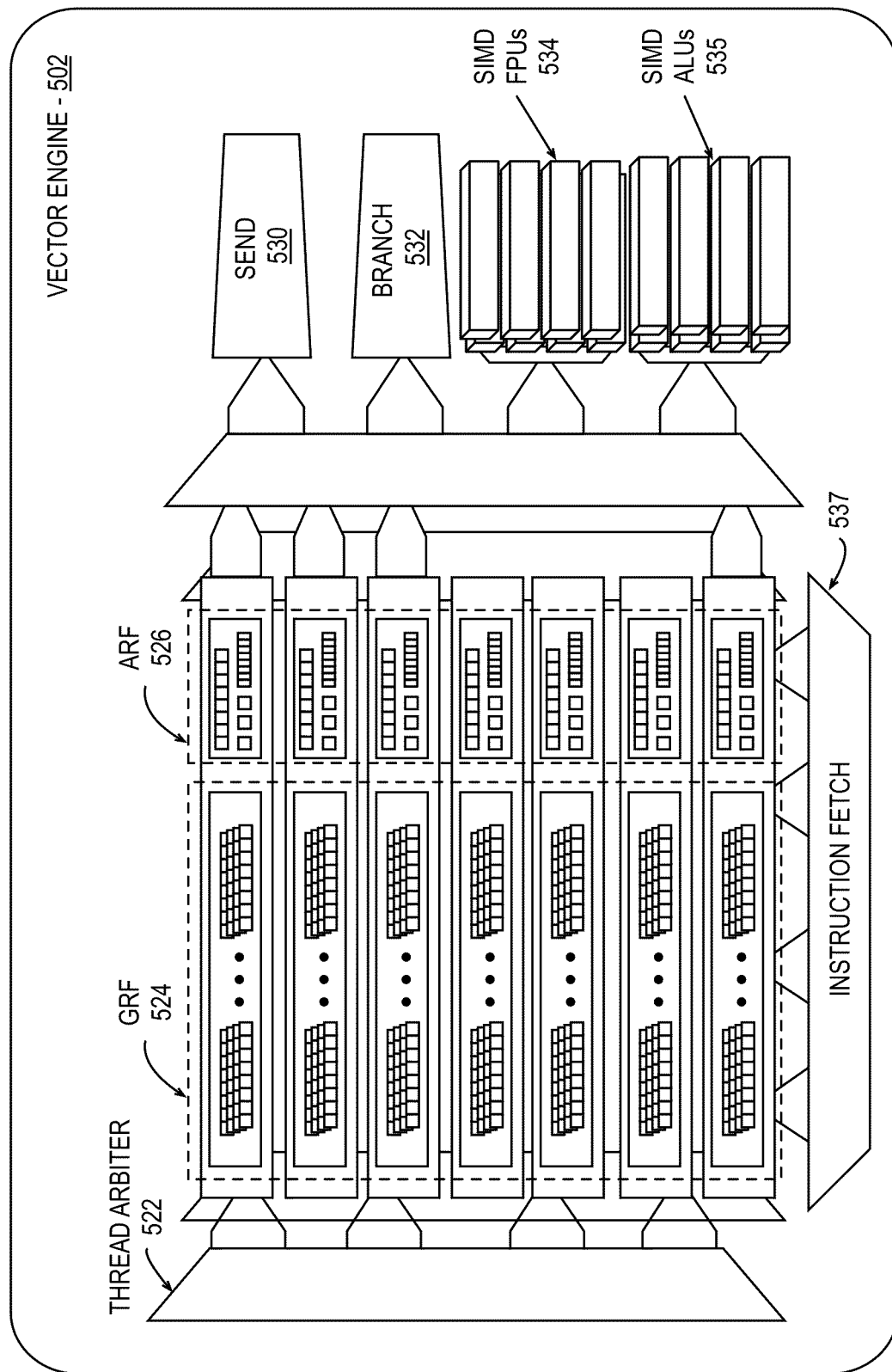
Figure 5C:
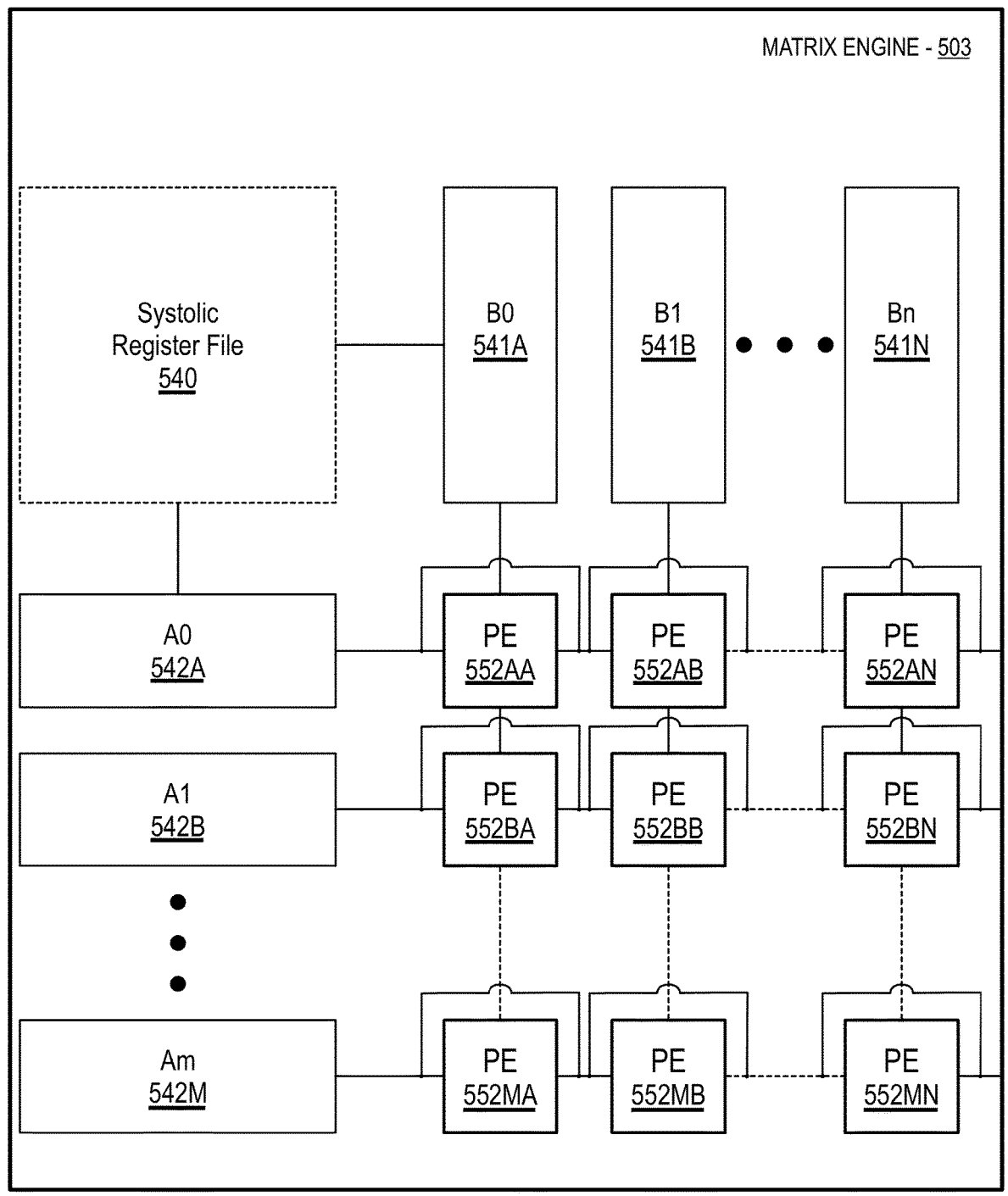

FIG. 5A-5C illustrate execution logic including an array of processing elements employed in a graphics processor, according to embodiments described herein. FIG. 5A illustrates graphics core cluster, according to an embodiment. FIG. 5B illustrates a vector engine of a graphics core, according to an embodiment. FIG. 5C illustrates a matrix engine of a graphics core, according to an embodiment. Elements of FIG. 5A-5C having the same reference numbers as the elements of any other figure herein may operate or function in any manner similar to that described elsewhere herein but are not limited as such. For example, the elements of FIG. 5A-5C can be considered in the context of the graphics processor core block 219 of FIG. 2B, and/or the graphics core blocks 415A-415B of FIG. 4. In one embodiment, the elements of FIG. 5A-5C have similar functionality to equivalent components of the graphics processor 208 of FIG. 2A, the GPU 239 of FIG. 2C or the GPGPU 270 of FIG. 2D.

As shown in FIG. 5A, in one embodiment the graphics core cluster 414 includes a graphics core block 415, which may be graphics core block 415A or graphics core block 415B of FIG. 4. The graphics core block 415 can include any number of graphics cores (e.g., graphics core 515A, graphics core 515B, through graphics core 515N). Multiple instances of the graphics core block 415 may be included. In one embodiment the elements of the graphics cores 515A-515N have similar or equivalent functionality as the elements of the graphics cores 221A-221F of FIG. 2B. In such embodiment, the graphics cores 515A-515N each include circuitry including but not limited to vector engines 502A-502N, matrix engines 503A-503N, memory load/store units 504A-504N, instruction caches 505A-505N, data caches/shared local memory 506A-506N, ray tracing units 508A-508N, samplers 510A-2710N. The circuitry of the graphics cores 515A-515N can additionally include fixed function logic 512A-512N. The number of vector engines 502A-502N and matrix engines 503A-503N within the graphics cores 515A-515N of a design can vary based on the workload, performance, and power targets for the design. Within a graphics core, one or more instances of vector engines and matrix engines are grouped into an execution unit or other execution resource component.

With reference to graphics core 515A, the vector engine 502A and matrix engine 503A are configurable to perform parallel compute operations on data in a variety of integer and floating-point data formats based on instructions associated with shader programs. Each vector engine 502A and matrix engine 503A can act as a programmable general-purpose computational unit that is capable of executing multiple simultaneous hardware threads while processing multiple data elements in parallel for each thread. The vector engine 502A and matrix engine 503A support the processing of variable width vectors at various SIMD widths, including but not limited to SIMD8, SIMD16, and SID32. Input data elements can be stored as a packed data type in a register and the vector engine 502A and matrix engine 503A can process the various elements based on the data size of the elements. For example, when operating on a 256-bit wide vector, the 256 bits of the vector are stored in a register and the vector is processed as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible. In one embodiment, the vector engine 502A and matrix engine 503A are also configurable for SIMT operation on warps or thread groups of various sizes (e.g., 8, 16, or 32 threads).

Continuing with graphics core 515A, the memory load/store unit 504A services memory access requests that are issued by the vector engine 502A, matrix engine 503A, and/or other components of the graphics core 515A that have access to memory. The memory access request can be processed by the memory load/store unit 504A to load or store the requested data to or from cache or memory into a register file associated with the vector engine 502A and/or matrix engine 503A. The memory load/store unit 504A can also perform prefetching operations. In one embodiment, the memory load/store unit 504A is configured to provide SIMT scatter/gather prefetching or block prefetching for data stored in memory 610, from memory that is local to other tiles via the tile interconnect 608, or from system memory. Prefetching can be performed to a specific L1 cache (e.g., data cache/shared local memory 506A), the L2 cache 604 or the L3 cache 606. In one embodiment, a prefetch to the L3 cache 606 automatically results in the data being stored in the L2 cache 604.

The instruction cache 505A stores instructions to be executed by the graphics core 515A. In one embodiment, the graphics core 515A also includes instruction fetch and prefetch circuitry that fetches or prefetches instructions into the instruction cache 505A. The graphics core 515A also includes instruction decode logic to decode instructions within the instruction cache 505A. The data cache/shared local memory 506A can be configured as a data cache that is managed by a cache controller that implements a cache replacement policy and/or configured as explicitly managed shared memory. The ray tracing unit 508A includes circuitry to accelerate ray tracing operations. The sampler 510A provides texture sampling for 3D operations and media sampling for media operations. The fixed function logic 512A includes fixed function circuitry that is shared between the various instances of the vector engine 502A and matrix engine 503A. Graphics cores 515B-515N can operate in a similar manner as graphics core 515A.

Functionality of the instruction caches 505A-505N, data caches/shared local memory 506A-506N, ray tracing units 508A-508N, samplers 510A-2710N, and fixed function logic 512A-512N corresponds with equivalent functionality in the graphics processor architectures described herein. For example, the instruction caches 505A-505N can operate in a similar manner as instruction cache 255 of FIG. 2D. The data caches/shared local memory 506A-506N, ray tracing units 508A-508N, and samplers 510A-2710N can operate in a similar manner as the cache/SLM 228A-228F, ray tracing units 227A-227F, and samplers 226A-226F of FIG. 2B. The fixed function logic 512A-512N can include elements of the geometry/fixed function pipeline 231 and/or additional fixed function logic 238 of FIG. 2B. In one embodiment, the ray tracing units 508A-508N include circuitry to perform ray tracing acceleration operations performed by the ray tracing cores 245 of FIG. 2C.

As shown in FIG. 5B, in one embodiment the vector engine 502 includes an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of integer SIMD ALUs 535. The GRF 524 and ARF 526 includes the set of general register files and architecture register files associated with each hardware thread that may be active in the vector engine 502. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the vector engine 502 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per graphics core, where graphics core resources are divided across logic used to execute multiple simultaneous threads. The number of logical threads that may be executed by the vector engine 502 is not limited to the number of hardware threads, and multiple logical threads can be assigned to each hardware thread.

In one embodiment, the vector engine 502 can co-issue multiple instructions, which may each be different instructions. The thread arbiter 522 can dispatch the instructions to one of the send unit 530, branch unit 532, or SIMD FPU(s) 534 for execution. Each execution thread can access 128 general-purpose registers within the GRF 524, where each register can store 32 bytes, accessible as a variable width vector of 32-bit data elements. In one embodiment, each thread has access to 4 Kbytes within the GRF 524, although embodiments are not so limited, and greater or fewer register resources may be provided in other embodiments. In one embodiment the vector engine 502 is partitioned into seven hardware threads that can independently perform computational operations, although the number of threads per vector engine 502 can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the vector engine 502 includes one or more SIMD floating point units (FPU(s)) 534 to perform floating-point operations. In one embodiment, the FPU(s) 534 also support integer computation. In one embodiment the FPU(s) 534 can execute up to M number of 32-bit floating-point (or integer) operations or execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 535 are also present and may be specifically optimized to perform operations associated with machine learning computations. In one embodiment, the SIMD ALUs are replaced by an additional set of SIMD FPUs 534 that are configurable to perform integer and floating-point operations. In one embodiment, the SIMD FPUs 534 and SIMD ALUs 535 are configurable to execute SIMT programs. In one embodiment, combined SIMD+SIMT operation is supported.

In one embodiment, arrays of multiple instances of the vector engine 502 can be instantiated in a graphics core. For scalability, product architects can choose the exact number of vector engines per graphics core grouping. In one embodiment the vector engine 502 can execute instructions across a plurality of execution channels. In a further embodiment, each thread executed on the vector engine 502 is executed on a different channel.

As shown in FIG. 5C, in one embodiment the matrix engine 503 includes an array of processing elements that are configured to perform tensor operations including vector/matrix and matrix/matrix operations, such as but not limited to matrix multiply and/or dot product operations. The matrix engine 503 is configured with M rows and N columns of processing elements (PE 552AA-PE 552MN) that include multiplier and adder circuits organized in a pipelined fashion. In one embodiment, the processing elements 552AA-PE 552MN make up the physical pipeline stages of an N wide and M deep systolic array that can be used to perform vector/matrix or matrix/matrix operations in a data-parallel manner, including matrix multiply, fused multiply-add, dot product or other general matrix-matrix multiplication (GEMM) operations. In one embodiment the matrix engine 503 supports 16-bit floating point operations, as well as 8-bit, 4-bit, 2-bit, and binary integer operations. The matrix engine 503 can also be configured to accelerate specific machine learning operations. In such embodiments, the matrix engine 503 can be configured with support for the bfloat (brain floating point) 16-bit floating point format or a tensor float 32-bit floating point format (TF32) that have different numbers of mantissa and exponent bits relative to Institute of Electrical and Electronics Engineers (IEEE) 754 formats.

In one embodiment, during each cycle, each stage can add the result of operations performed at that stage to the output of the previous stage. In other embodiments, the pattern of data movement between the processing elements 552AA-552MN after a set of computational cycles can vary based on the instruction or macro-operation being performed. For example, in one embodiment partial sum loopback is enabled and the processing elements may instead add the output of a current cycle with output generated in the previous cycle. In one embodiment, the final stage of the systolic array can be configured with a loopback to the initial stage of the systolic array. In such embodiment, the number of physical pipeline stages may be decoupled from the number of logical pipeline stages that are supported by the matrix engine 503. For example, where the processing elements 552AA-552MN are configured as a systolic array of M physical stages, a loopback from stage M to the initial pipeline stage can enable the processing elements 552AA-PE552MN to operate as a systolic array of, for example, 2M, 3M, 4M, etc., logical pipeline stages.

In one embodiment, the matrix engine 503 includes memory 541A-541N, 542A-542M to store input data in the form of row and column data for input matrices. Memory 542A-542M is configurable to store row elements (A0-Am) of a first input matrix and memory 541A-541N is configurable to store column elements (B0-Bn) of a second input matrix. The row and column elements are provided as input to the processing elements 552AA-552MN for processing. In one embodiment, row and column elements of the input matrices can be stored in a systolic register file 540 within the matrix engine 503 before those elements are provided to the memory 541A-541N, 542A-542M. In one embodiment, the systolic register file 540 is excluded and the memory 541A-541N, 542A-542M is loaded from registers in an associated vector engine (e.g., GRF 524 of vector engine 502 of FIG. 5B) or other memory of the graphics core that includes the matrix engine 503 (e.g., data cache/shared local memory 506A for matrix engine 503A of FIG. 5A). Results generated by the processing elements 552AA-552MN are then output to an output buffer and/or written to a register file (e.g., systolic register file 540, GRF 524, data cache/ shared local memory 506A-506N) for further processing by other functional units of the graphics processor or for output to memory.

In some embodiments, the matrix engine 503 is configured with support for input sparsity, where multiplication operations for sparse regions of input data can be bypassed by skipping multiply operations that have a zero-value operand. In one embodiment, the processing elements 552AA-552MN are configured to skip the performance of certain operations that have zero value input. In one embodiment, sparsity within input matrices can be detected and operations having known zero output values can be bypassed before being submitted to the processing elements 552AA-552MN. The loading of zero value operands into the processing elements can be bypassed and the processing elements 552AA-552MN can be configured to perform multiplications on the non-zero value input elements. The matrix engine 503 can also be configured with support for output sparsity, such that operations with results that are pre-determined to be zero are bypassed. For input sparsity and/or output sparsity, in one embodiment, metadata is provided to the processing elements 552AA-552MN to indicate, for a processing cycle, which processing elements and/or data channels are to be active during that cycle.

In one embodiment, the matrix engine 503 includes hardware to enable operations on sparse data having a compressed representation of a sparse matrix that stores non-zero values and metadata that identifies the positions of the non-zero values within the matrix. Exemplary compressed representations include but are not limited to compressed tensor representations such as compressed sparse row (CSR), compressed sparse column (CSC), compressed sparse fiber (CSF) representations. Support for compressed representations enable operations to be performed on input in a compressed tensor format without requiring the compressed representation to be decompressed or decoded. In such embodiment, operations can be performed only on non-zero input values and the resulting non-zero output values can be mapped into an output matrix. In some embodiments, hardware support is also provided for machine-specific lossless data compression formats that are used when transmitting data within hardware or across system busses. Such data may be retained in a compressed format for sparse input data and the matrix engine 503 can used the compression metadata for the compressed data to enable operations to be performed on only non-zero values, or to enable blocks of zero data input to be bypassed for multiply operations.

In various embodiments, input data can be provided by a programmer in a compressed tensor representation, or a codec can compress input data into the compressed tensor representation or another sparse data encoding. In addition to support for compressed tensor representations, streaming compression of sparse input data can be performed before the data is provided to the processing elements 552AA-552MN. In one embodiment, compression is performed on data written to a cache memory associated with the graphics core cluster 414, with the compression being performed with an encoding that is supported by the matrix engine 503. In one embodiment, the matrix engine 503 includes support for input having structured sparsity in which a pre-determined level or pattern of sparsity is imposed on input data. This data may be compressed to a known compression ratio, with the compressed data being processed by the processing elements 552AA-552MN according to metadata associated with the compressed data.

Figure 6:
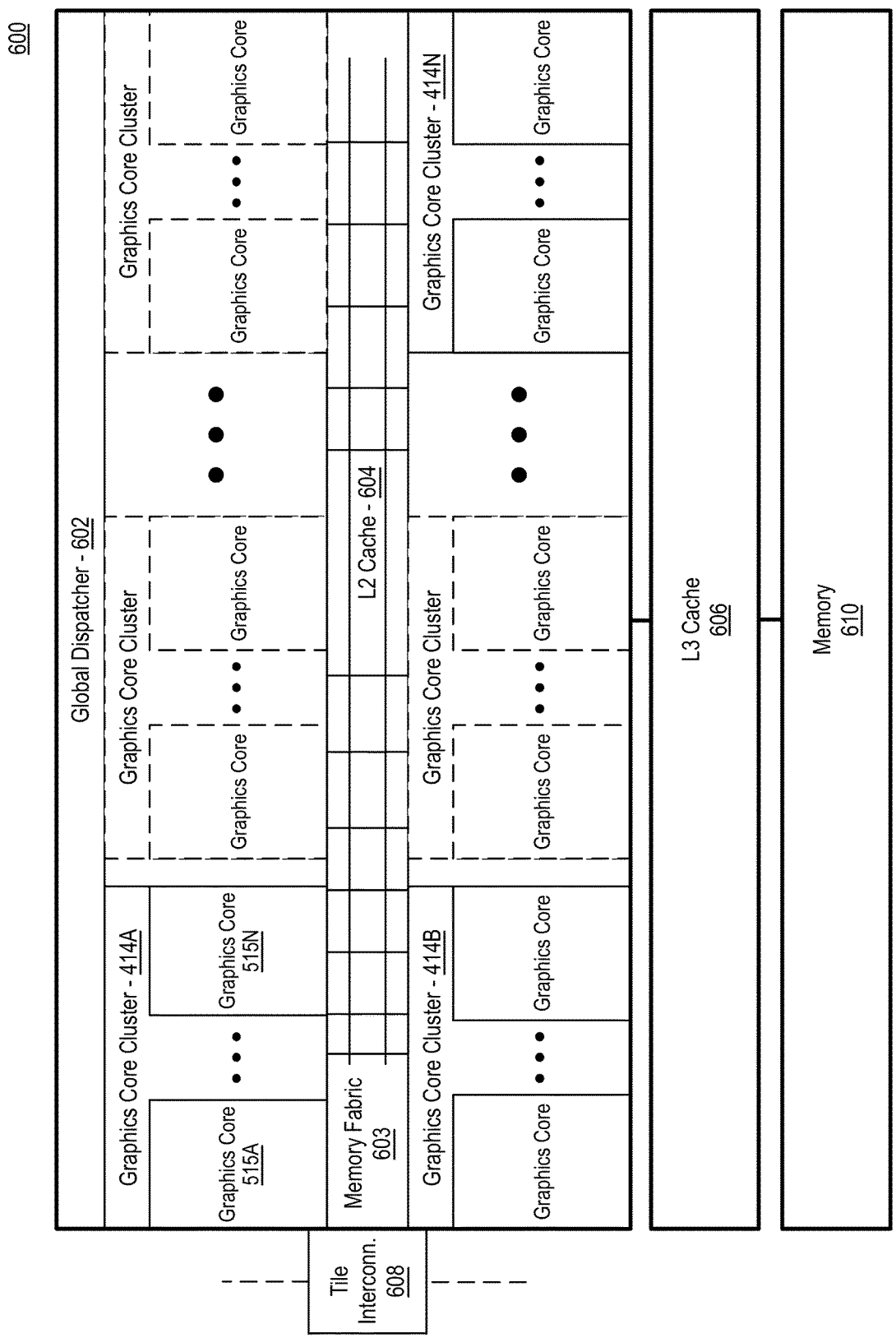
FIG. 6 illustrates a tile of a multi-tile processor, according to an embodiment.

FIG. 6 illustrates a tile 600 of a multi-tile processor, according to an embodiment. In one embodiment, the tile 600 is representative of one of the graphics engine tiles 310A-310D of FIG. 3B or compute engine tiles 340A-340D of FIG. 3C. The tile 600 of the multi-tile graphics processor includes an array of graphics core clusters (e.g., graphics core cluster 414A, graphics core cluster 414B, through graphics core cluster 414N), with each graphics core cluster having an array of graphics cores 515A-515N. The tile 600 also includes a global dispatcher 602 to dispatch threads to processing resources of the tile 600.

The tile 600 can include or couple with an L3 cache 606 and memory 610. In various embodiments, the L3 cache 606 may be excluded or the tile 600 can include additional levels of cache, such as an L4 cache. In one embodiment, each instance of the tile 600 in the multi-tile graphics processor has an associated memory 610, such as in FIG. 3B and FIG. 3C. In one embodiment, a multi-tile processor can be configured as a multi-chip module in which the L3 cache 606 and/or memory 610 reside on separate chiplets than the graphics core clusters 414A-414N. In this context, a chiplet is an at least partially packaged integrated circuit that includes distinct units of logic that can be assembled with other chiplets into a larger package. For example, the L3 cache 606 can be included in a dedicated cache chiplet or can reside on the same chiplet as the graphics core clusters 414A-414N. In one embodiment, the L3 cache 606 can be included in an active base die or active interposer, as illustrated in FIG. 12C.

A memory fabric 603 enables communication among the graphics core clusters 414A-414N, L3 cache 606, and memory 610. An L2 cache 604 couples with the memory fabric 603 and is configurable to cache transactions performed via the memory fabric 603. A tile interconnect 608 enables communication with other tiles on the graphics processors and may be one of tile interconnects 323A-323F of FIGS. 3B and 3C. In embodiments in which the L3 cache 606 is excluded from the tile 600, the L2 cache 604 may be configured as a combined L2/L3 cache. The memory fabric 603 is configurable to route data to the L3 cache 606 or memory controllers associated with the memory 610 based on the presence or absence of the L3 cache 606 in a specific implementation. The L3 cache 606 can be configured as a per-tile cache that is dedicated to processing resources of the tile 600 or may be a partition of a GPU-wide L3 cache.

Power Management Circuitry

Figure 7:
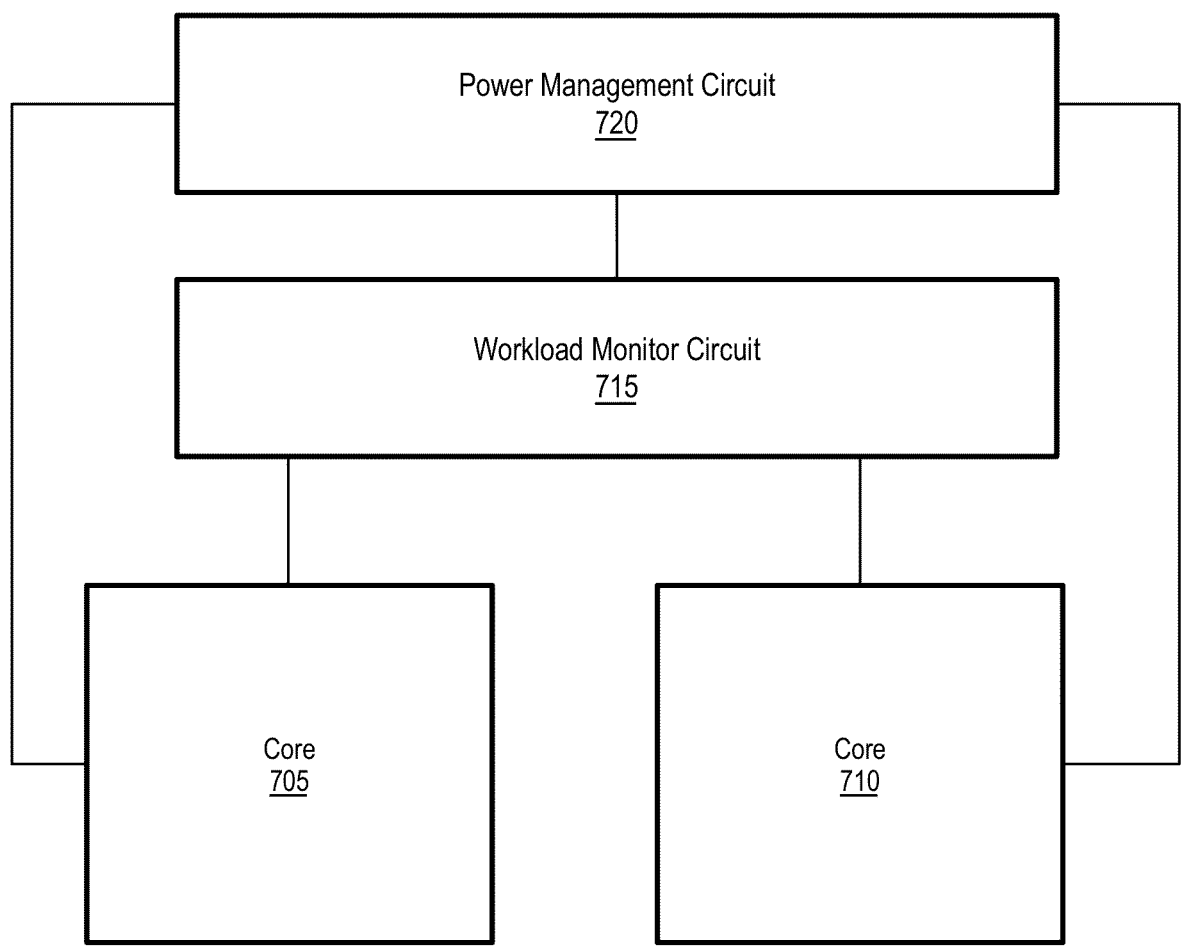
FIG. 7 illustrates a system including circuitry to balance power between multiple processing elements.

FIG. 7 illustrates a system 700 including circuitry to balance power between multiple processing elements. The system includes a power management circuit 720, a workload monitor circuit 715, and a set of multiple processing cores, including core 705 and core 710. The power management circuit 720 includes or couples with a power control module, which may include hardware, firmware, software, or a combination thereof. The power management circuit 720 and is configured to balance and allocate power and frequency between devices of an integrated circuit that includes core 705 and core 710. The workload monitor circuit 715 is to monitor the current or pending workloads to be executed by core 705 and core 710.

In various embodiments, core 705 and core 710 may be any processing core described herein, including one of the one or more processor cores 107 of FIG. 1, core 202A-202N of FIG. 2A, graphics cores 221A-221F of FIG. 2B, multi-core group 240A-240N of FIG. 2C, or compute units 260A-260N as in FIG. 2D. At another level of granularity, core 705 and/or core 710 may be one of the vector engines 222A-222F, 224A-224F or matrix engines 223A-223F, 225A-225F within the graphics cores 221A-221F. Core 705 and/or core 710 may also be one or more of the graphics cores 243, tensor cores 244, or ray tracing cores 245 of a multi-core group 240A-240N. Core 705 and/or core 710 may also be the vector logic units 263 or scalar logic units 264 of a compute unit 260A-260N.

The workload monitor circuit 715 can determine the current or pending workloads based on, for example, the number of instructions executed within a window of time or scheduled for execution. In one embodiment, a hardware register, counter, and/or accumulator associated with each of cores 705, 710 track active cycles. Upon expiration of a period of measurement, the number of active cycles is determined for the period. As another example, a microcontroller executes code that causes hardware to track active cycles over a period. Moreover, microcode, privileged-level code, application code, or other code may be executed to similarly cause hardware to track active cycles over the period of measurement.

In one embodiment, power management circuit 720 is configured to dynamically balance performance between cores 705, 710 based on workload determination from workload monitor circuit 715. Balancing performance between cores includes modifying any metric or factor that affects core performance and/or power. For example, if separate power delivery is provided for core 705 relative to core 710, then the power delivery or limits thereof may be altered to balance performance there between. Frequency between the individual cores is also balanced. The power management circuit 720 can dynamically tune frequency allocation between core 705 and core 710 based on a power limit for an integrated circuit or package including cores 705, 710 and one or more workloads as determined by workload monitor circuit 715. Note that frequency may not be directly altered in some embodiments, but rather an underlying metric, such as current, is altered to affect a change in frequency.

As one example, power management circuit 720 can increase the frequency for core 705 and/or decrease frequency for core 710 in response to the dynamically determined workload for core 705 being greater the workload for core 710. If one core is demonstrating a greater need of performance due to a higher workload, then its frequency is increased. When an integrated circuit including cores 705 and 710 are up against a power limit, then the core demonstrating less need for performance requirements is decreased in frequency to counterbalance/compensate for the increase in frequency to the other core. In another example, power management circuit 720 is to increase frequency for core 705 and/or decrease frequency for core 710 in response to determining core 705 is a performance bottleneck. The frequency of core 705 can be increased to enable an improvement in overall performance, even if the frequency of core 710 is temporarily reduced to stay within a power envelope. In some embodiment, hysteresis may be utilized to avoid a see-saw effect in which power/performance balance bounces between settings.

Any hardware, firmware, microcode, software, or combination thereof may perform the balancing, tuning, and/or allocating described above. As one example, the balancing policies are implemented in a Power Control Unit (PCU), which often includes a microcontroller configured to execute collocated power code. Here, the power code, when executed by the microcontroller, loads workload information from workload monitor circuit 715, determines an appropriate balancing action (e.g., increasing frequency of cores 710), and initiates the balancing action (e.g., indicates the frequency increase, enabling hardware/logic to increase the frequency). As another example, code and hardware are both utilized for balancing. In one scenario, a graphics driver associated with core 710 loads the graphics workload information from the workload monitor circuit 720. Either the device driver, a privileged level power service routine (e.g., OS service routine), or other code/hardware determines if a balancing action is to be taken at least based on the graphics workload information. Additionally, core 705 workload information may also be considered to determine the appropriate balancing action.

Figure 8A:
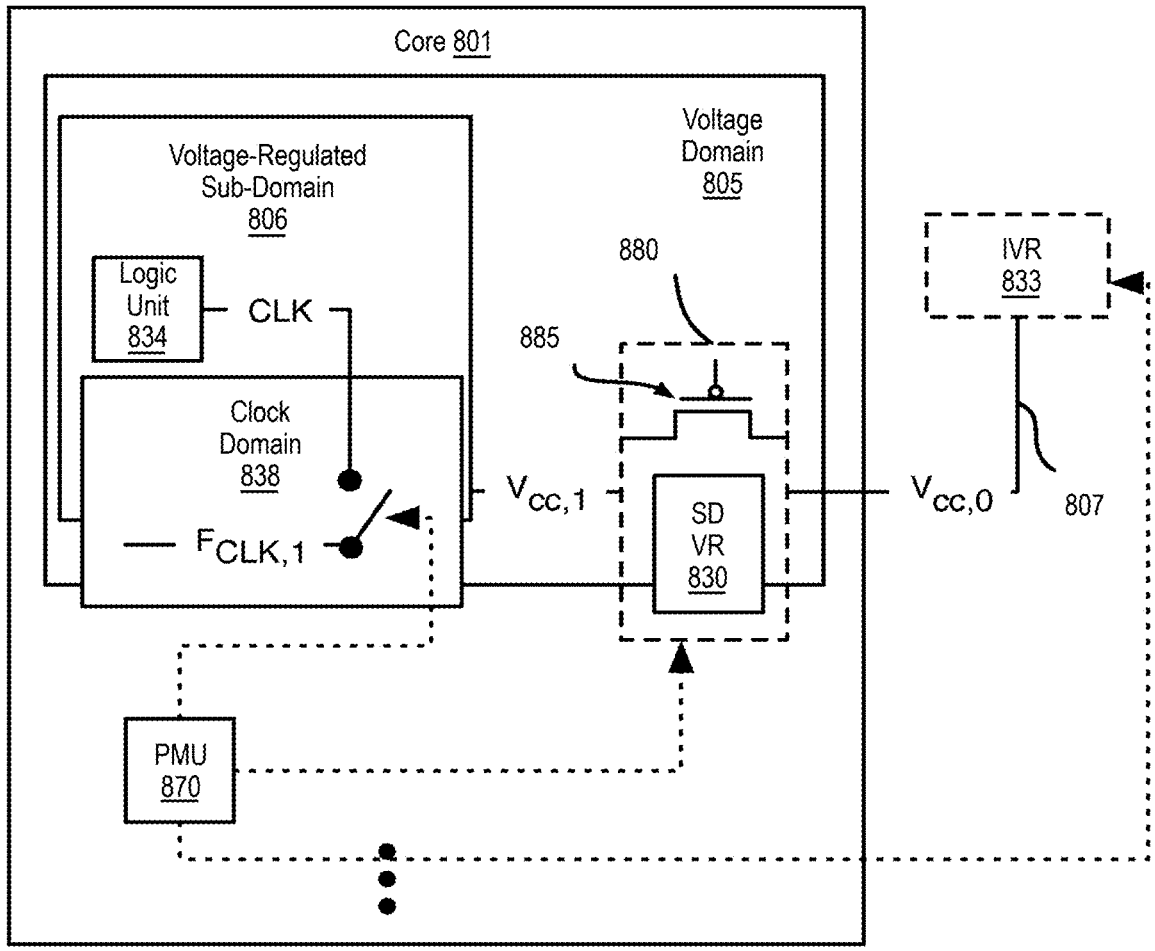
FIG. 8A-8C illustrates the balancing of power between voltage regulated subdomains within a voltage domain, in addition to balancing power between multiple cores.
Figure 8B:
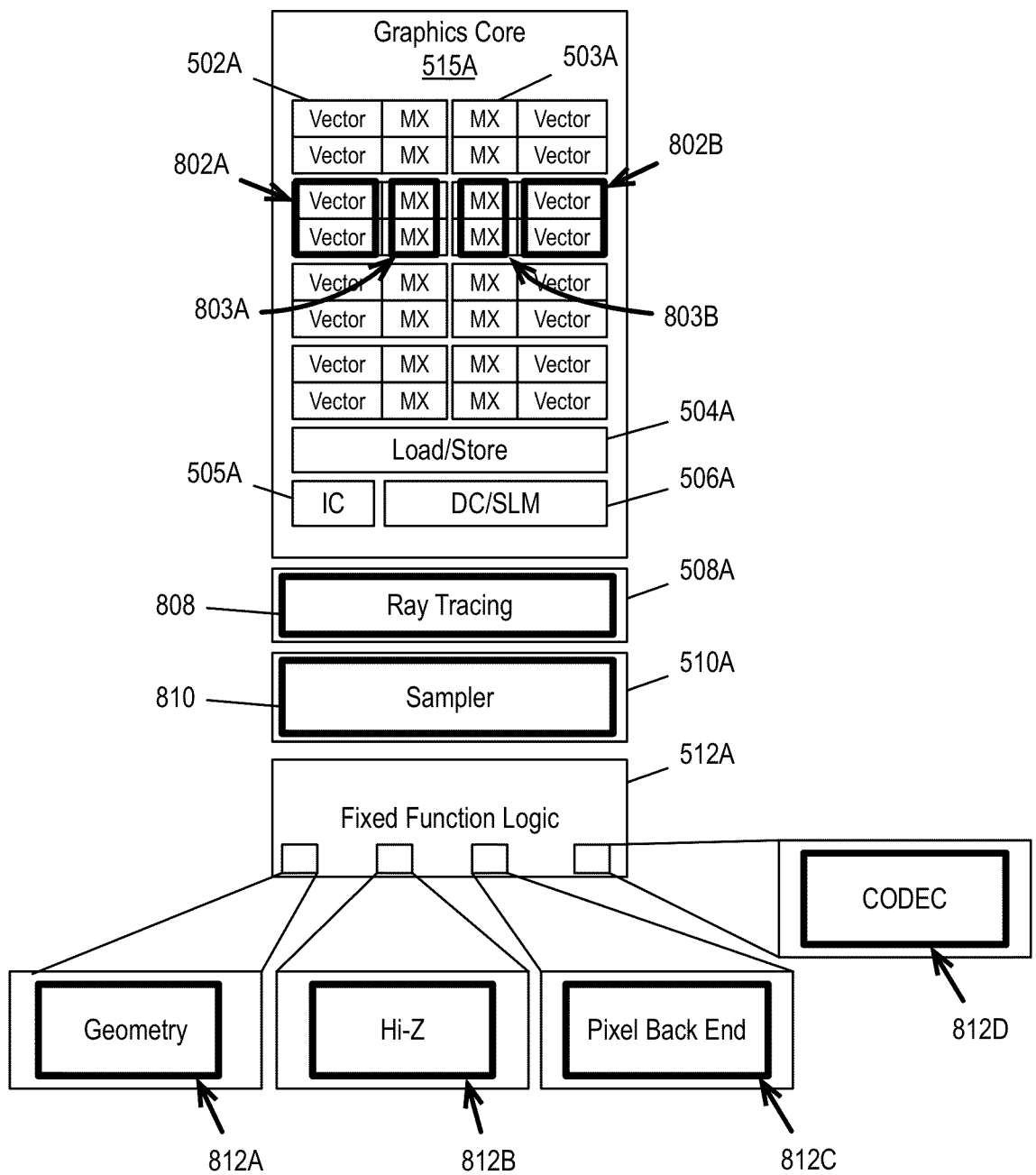
Figure 8C:
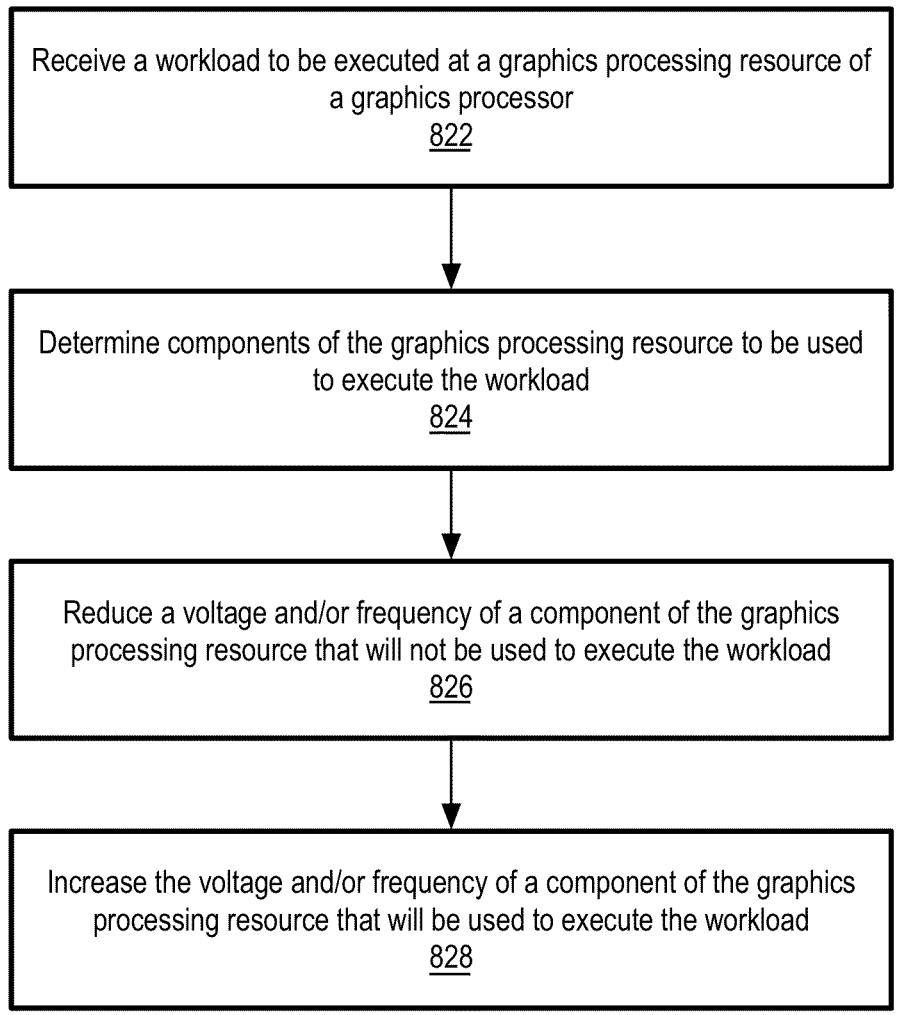

In one embodiment, the balancing decision maker also considers a software hint to determine how performance/power is to be balanced among processing elements. For example, GPU cores 710 workload information is determined, as discussed above. And an executing application provides a software hint of whether a future workload (i.e., a portion of the application) is to include a larger or smaller graphics workload in comparison to a previous portion of the application that resulted in the measured workload. Here, if the GPU is close to a threshold (or close to fully occupied) and the applicant hints that a next period is associated with a greater graphics workload, then the power management circuit 720 may determine that GPU frequency is to be increased and CPU frequency is to be capped; even if the previous activity has not reached an activity threshold. As a result, the hint aids in predicting future activity; instead of relying purely on previous, measured workload information. Note that a hint may be provided through an Instruction Set Architecture defining such a hint, an Application Program Interface (API), or other known structure/method for communicating information from software to hardware. Using Voltage-Regulated Subdomains to Enable Partial Power-down of Execution Units FIG. 8A-8C illustrates the balancing of power between voltage regulated subdomains within a voltage domain, in addition to balancing power between multiple cores. FIG. 8A is a functional block diagram illustrating a graphics core power management architecture employing subdomain voltage regulation, in accordance with an embodiment. FIG. 8B illustrates using subdomain voltage regulation to decouple power delivery between individual functional units of a graphics processor core. FIG. 8C illustrates a method of using subdomain voltage regulation to decouple power delivery between individual functional units of a graphics processor core.

FIG. 8A illustrates a core 801, which can be, for example any one of core 705 or core 710 as in FIG. 7. Core 801 includes a voltage domain 805. A voltage domain is a grouping of functional logic circuit units (LU) that are operated at a same domain voltage (e.g., $V_{cc,0}$) as provided by a supply rail 807 of a first voltage regulator (e.g., IVR 833). Although only one voltage domain 805 is illustrated in FIG. 8A for the sake of clarity, core 801 may have a number of voltage domains enabling different operating voltages across different functional logic units. Voltage-regulated subdomain (VRSD) 806 is within voltage domain 805. A voltage-regulated subdomain entails one or more logic unit that is reliant upon a supply voltage of the voltage domain with which it is associated and is further operable at a voltage regulated to other than the domain voltage. More specifically, a voltage-regulated subdomain entails one or more logic unit that can be controlled to at least one operating voltage below that of the voltage domain from which the subdomain is powered.

VRSD 806 is powered through a supply branch 880 off domain voltage supply rail 807. Supply branch 880 functionally includes a subdomain voltage regulator (SDVR) 830 to regulate the subdomain voltage $V_{cc,1}$ down to a suitable value below domain voltage $V_{cc,0}$ that will maintain LU 834 in an operational state. Implementations of SDVR 830 may vary, as is described in more detail below. SDVR 830 is notably down stream of IVR 833, and therefore relatively more local than IVR 833. SDVR 830 may be advantageously entirely integrated on the same die as graphics core 801, whereas IVR 833 may include at least external magnetics (e.g., integrated at a package level, or second chip, etc.).

In further embodiments, a subdomain power supply branch includes power gate functionality. For example, supply branch 880 includes functionality of a power gate transistor 885 operable to gate the domain voltage $V_{cc,0}$ (e.g., $V_{cc,1}=0$ when power gate transistor 885 is turned off) and thereby place LU 834 into a non-operable or inactive "sleep" state. This power gate functionality serves to reduce leakage loss at any given domain voltage $V_{cc,0}$ when SDVR 830 is not regulating subdomain voltage to some operational voltage. In addition to the voltage regulation and power gating modes, in further embodiments a subdomain power supply branch is additionally configurable to bypass SDVR 830 in a "bypass" mode during which the subdomain voltage $V_{cc,1}$ is equal to domain voltage $V_{cc,0}$, or very nearly so (e.g., $V_{cc,1} \sim V_{cc,0}$ when power gate transistor 885 is turned on).

With the supply branch functionality illustrated in FIG. 8A, VRSD 806 is operable both in a "VR-mode" in which LU 834 is operable at a different (e.g., lower) regulated voltage than domain voltage $V_{cc,0}$, and in a "power domain-mode" where power to LU 834 is either gated or unified with remainder of voltage domain 805. Notably, while the exemplary embodiment in FIG. 8A illustrates that VRSD 806 is further operable in the power domain mode, a voltage-regulated subdomain need not have such gating/bypassing capability in addition to voltage regulation. Similarly, power domains need not be supplied through a subdomain voltage regulator. Therefore, within a given voltage domain, power domains may be provided independently from voltage-regulated subdomains.

In various embodiments, Dynamic Voltage and Frequency Scaling (DVFS) may be utilized to vary clock frequencies of one or more voltage domains (e.g., $V_{cc,0}$), and/or subdomains (e.g., $V_{cc,1}$) within graphics core 101. Such algorithms may be implemented by a power management unit (PMU) 870 to meet performance demands of given workload at a reduced power level, for example by using power gating to reduce high leakage power during idle time of voltage domain 805, or by reducing high power idle time at the finer granular level of a VRSD 806.

As shown by the dashed line in FIG. 8A, PMU 870 is communicatively coupled to both IVR 833 and SDVR 830, for example, as a controller of one or more of the domain voltage $V_{cc,0}$ and subdomain voltage $V_{cc,1}$. Reducing domain voltage $V_{cc,0}$ (and a target clock frequency, $F_{clk,1}$ for a clock domain 838 within voltage domain 805) yields a cubic reduction in dynamic power $(C(V_{cc,0})^2 F)$, related to the charging and discharging of logic transistors. An exponential reduction in leakage power $(I_{leak} V_{cc,0})$, related to transistor gate and channel leakage, is also achieved. To maintain voltage domain 805 in an operational state however, domain voltage $V_{cc,0}$ is maintained above a minimum threshold below which the logic transistors become inactive in a sleep state. This minimum active domain voltage threshold is a function of die-to-die and within die device variations in addition to dynamic variations as a result of worst-case voltage droops, junction temperatures, and aging.

Power domain gating and subdomain voltage regulation may further serve to reduce the power dissipated by a voltage domain operating at a given domain voltage either by turning off power to unused logic units of the domain executing a workload, or by reducing voltage to certain logic units within the voltage domain relative to other logic units within that voltage domain. Whereas a power domain or "sleep island" can be implemented with a number of power transistors, a voltage-regulated subdomain further comprises a subdomain voltage regulator. The power saving benefit achieved with the relatively more challenging implementation of a voltage-regulated subdomain is dependent on the subdomain architecture. The additional flexibility afforded by the possibility of mixing voltage-regulated subdomains and power domains also makes subdomain definition challenging.

LU 834 of VRSD 806 includes at least one execution unit (EU), graphics core, shader core, streaming multiprocessor, compute unit, or other processing resource. For example, in a graphics processor a processing resource can include one or more single-instruction-multiple-data (SIMD), single instruction multiple thread (SIMT), or other form of parallel or vector (ALU) or FPU. For one or more processing units in VRSD 806, the operating voltage(s) may be regulated down independently of the operating point for other logic units in voltage domain 805. This additional subdomain-level voltage regulation may provide further flexibility in tailoring graphics core power-performance point beyond modulating the number of active processing resources through power domain (gating) control. For example, rather than merely turning a processing unit on or off, the processing unit may be operated at a multiple different voltage-frequency (VF) pairings independent of other logic units in the voltage domain. If, however, it is known based on the workload to be executed by the processing resource that certain components of the processing resource will not be used, those sub-components of the processing resources may be power dated and fully disabled unless and until a workload is scheduled that will make use of those sub-resources.

FIG. 8B shows a graphics core 515A as described herein that includes multiple voltage-regulated subdomains that enables independent voltage and frequency regulation of functional units within the graphics core 515A. While graphics core 515A is illustrated, the described techniques can be applied to any implementation of core 705 and/or core 710 of FIG. 7.

As noted above with respect to FIG. 5A, graphics core 515A includes an array of execution resource components, or other functional units that include multiple instances of a vector engine 502 and a matrix engine 503. In one embodiment, within an execution resource component, each instance of a vector engine 502 is associated with VRSD 802A or VRSD 802B and each instance of a matrix engine 503 is associated with VRSD 803A or VRSD 803B. In one embodiment, the power, voltage, and frequency of VRSD 802A and VRSD 802B are separately controlled, while the power, voltage, and frequency of VRSD 803A and VRSD 803B are separately controlled. In such embodiment, the power, voltage, and frequency of the left column or grouping of vector engines is separately controlled from the right column or grouping of vector engines, while the power, voltage and frequency of the left column or grouping of matrix engines is separately controlled from the right column or grouping of matrix engines. In one embodiment, VRSD 802A-802B and/or VRSD 803A-803B have respective common controls. In such embodiment, power, voltage, and frequency for each vector engine 502 in the graphics core 515A are commonly controlled, while the power, voltage, and frequency of each matrix engine 503 commonly controlled, but the voltage and frequency of the vector engines can be controlled separately from the matrix engines. In one embodiment, the load/store unit 504A, instruction cache 505A, and data cache/shared local memory 506A are associated with the overall voltage domain of the graphics core 515A, as those components are active whenever the graphics core 515A is performing operations. In a further embodiment, additional components of the graphics core 515A can have separate voltage-regulated subdomains. For example, the ray tracing unit 508A can be included in VRSD 808 and the sampler 510A can be included in VRSD 810. Within the fixed function logic 512A, separate voltage-regulated subdomains 812A-812D may be provided respectively for the geometry, hierarchical-Z, pixel back-end, and video codec logic.

In one embodiment, based on functionality provided by the workload monitor circuit 715 of FIG. 7, for example, or equivalent hardware, software, or firmware logic, the various voltage-regulated subdomains can be separately adjusted or disabled for workloads that emphasize or de-emphasize the functional units associated with the respective voltage-regulated subdomains. For example, when the graphics core 515A is not executing or scheduling instructions that will use a matrix engine 503, VRSD 803A-803B can be power gated to disable the matrix engines in the graphics core 515A. The matrix engines of the graphics core 515A can be disabled separately for each graphics core, as another one of the graphics cores 515A-515N may be executing instructions that perform operations on a matrix engine 503.

Likewise, any of VRSD 808, VRSD 810, and/or VRSD 812A-812C can be disabled when components within those subdomains are not in use. For example, when the graphics core 515A is executing general purpose compute operations that are not associated with rendering operations, the voltage-regulated subdomains associated with graphics processing functionality can be disabled. When graphics processing operations are being executed that do not make use of ray tracing, VRSD 808 can be disabled. Alternatively, where workloads make extensive use of the matrix engine 503 or ray tracing unit 508A, the relative frequency of VRSD 803A-803B or VRSD 808 can be increased. Additionally, the relative balance between the performance of the vector engines and matrix engines can be adjusted within the power limits available to the graphics core 515A.

FIG. 8C illustrates a method 820 that use subdomain voltage regulation to decouple power delivery between individual functional units of a graphics processor core. According to method 820, a graphics processor can receive a workload to be executed at a graphics processing resource of the graphics processor (822). The graphics processing resource can be a graphics core described herein, or an equivalent level of graphics processor hierarchy, such as a compute unit or streaming multiprocessor. The graphics processor, or an individual graphics core or equivalent graphics processing resource can determine components of the graphics processing resource to be used to execute the workload (824). In one embodiment, the components of the graphics processing resource to be used can be determined based on commands within a command buffer to be executed. For example, render commands will make use of graphics pipeline circuitry, while compute-only workloads will not make use of graphics pipeline circuitry, although graphics and compute workloads may be executed concurrently. Furthermore, it can be determined that if a non-tensor workload will be executed, the matrix engines will not be used. If ray tracing is disabled for a render workload, ray tracing circuitry will not be used. Other techniques may also be used. For example, if only compute contexts are active on the graphics processor, it may be determined that render functionality will not be used.

Power management circuitry associated with the processing resource can reduce a voltage and/or frequency of a component of the graphics processing resource that will not be used to execute the workload (826). The voltage of the processing resource component can be reduced via the VRSD associated with that processing resource component, with the frequency being reduced according to the frequencies supported by the reduced voltage. The reduction of the voltage and/or frequency can include disabling the component. Depending on the power savings realized by reducing the voltage associated with unused components for a workload, the power management circuitry associated with the processing resource can increase the voltage and/or frequency of a component of the processing resource that will be used to execute the workload (828). The voltage of the processing resource component can be increased via the VRSD associated with that processing resource component, with the frequency being increased according to the frequencies supported by the increased voltage. For example, if matrix engines are disabled or operated at reduced voltage, the voltage and frequency associated with vector engines or render pipeline components can be increased.

Granular GPU DVFS

In one embodiment, the various processing clusters of a graphics processor can be divided into power islands. Power savings and/or performance improvements may be realized by balancing the voltages and frequencies of clusters of graphics processors. Granular GPU dynamic voltage and frequency scaling may be applied under scenarios where workloads are not sufficiently demanding enough to utilize all of the processing clusters of a graphics processor. In such scenarios, the frequency of one or more clusters may be reduced, while other clusters may be disabled entirely. This approach enables graphics processors with very high-performance potential to operate at significantly reduced power when executing light workloads.

Figure 9:
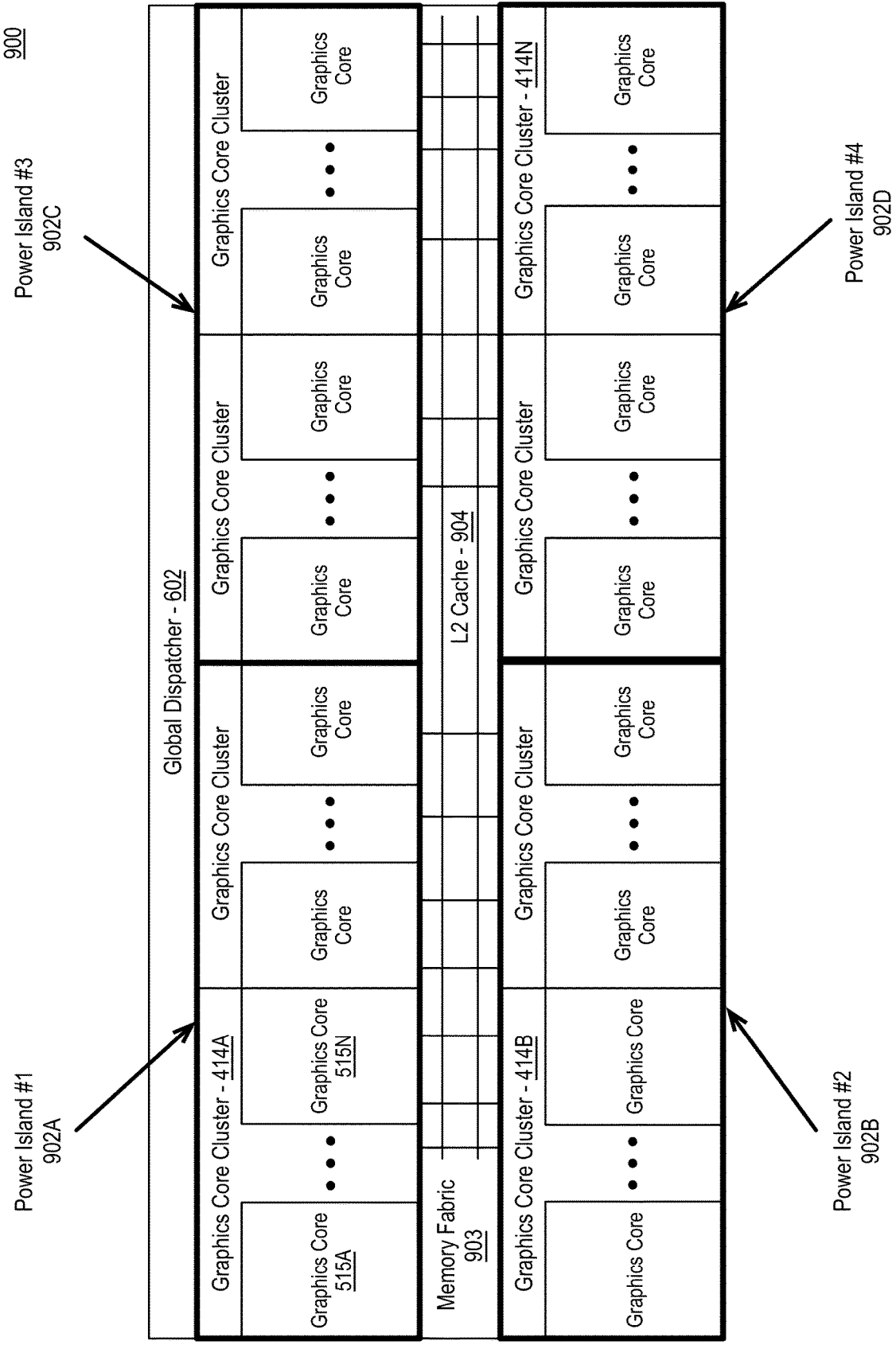
FIG. 9 illustrates granular dynamic voltage and frequency scaling for a graphics processor.

FIG. 9 illustrates granular DVFS for a graphics processor 900. With additional reference to tile 600 of the multi-tile processor of FIG. 6, multiple power islands 902A-902D can be configured for the graphics processor 900. Each of the multiple power islands 902A-902D can include multiple graphics core clusters 414A-414N, each of the graphics core clusters 414A-414N including multiple graphics cores 515A-515N. In one embodiment, the power islands 902A-902D can be configured such that, for example, a first power island 902A and a fourth power island 902D are configured with a first voltage and frequency setting (e.g., 1V, 2 Ghz). Concurrently, a second power island 902B is disabled (e.g., 0V, 0 Ghz) and a third power island 902C operates at a reduced voltage and frequency (e.g., 0.7V, 1 Ghz).

For multi-tile processors such as graphics processor 320 of FIG. 3B or compute accelerator 330 of FIG. 3C, or the multi-tile processor of FIG. 6, the various tiles (e.g., graphics engine tiles 310A-310D, compute engine tile 340A-340D, tile 600) can act as separate power islands, with the voltage and frequency of each tile being separately configurable, with one or more of the tiles capable of being disabled when not in use.

The voltage and frequency settings for a power island can be adjusted based on the workloads executed by the graphics processor cores within the power island. Where the graphics processor 900 can be partitioned to present separate software interfaces associated with different groups of core clusters, a power island can correspond with a partition of the graphics processor 900, to enable separate voltage and frequency scaling for each partition. Execution of workloads received at the separate software interfaces will be restricted to the processing resources associated with that software interface. The voltage and frequency of the separate power islands can be scaled independently according to the workload received at the separate software interfaces.

When workload scheduling is available to all processing resources of the graphics processor 900, scheduler or dispatch logic (e.g., global dispatcher 602) will avoid scheduling workloads to graphics processing resources within a disabled power island. The scheduler or dispatch logic will avoid scheduling or dispatching instructions to disabled power islands until processing resources within active power islands are at full utilization. The voltage and frequency of active power islands can be progressively increased until a maximum frequency or utilization threshold is reached. At that point, a disabled power island is be enabled and the voltage and frequency of that power island is scaled according to power limitations as balanced against the requirements of the executed workloads.

Figure 10A:
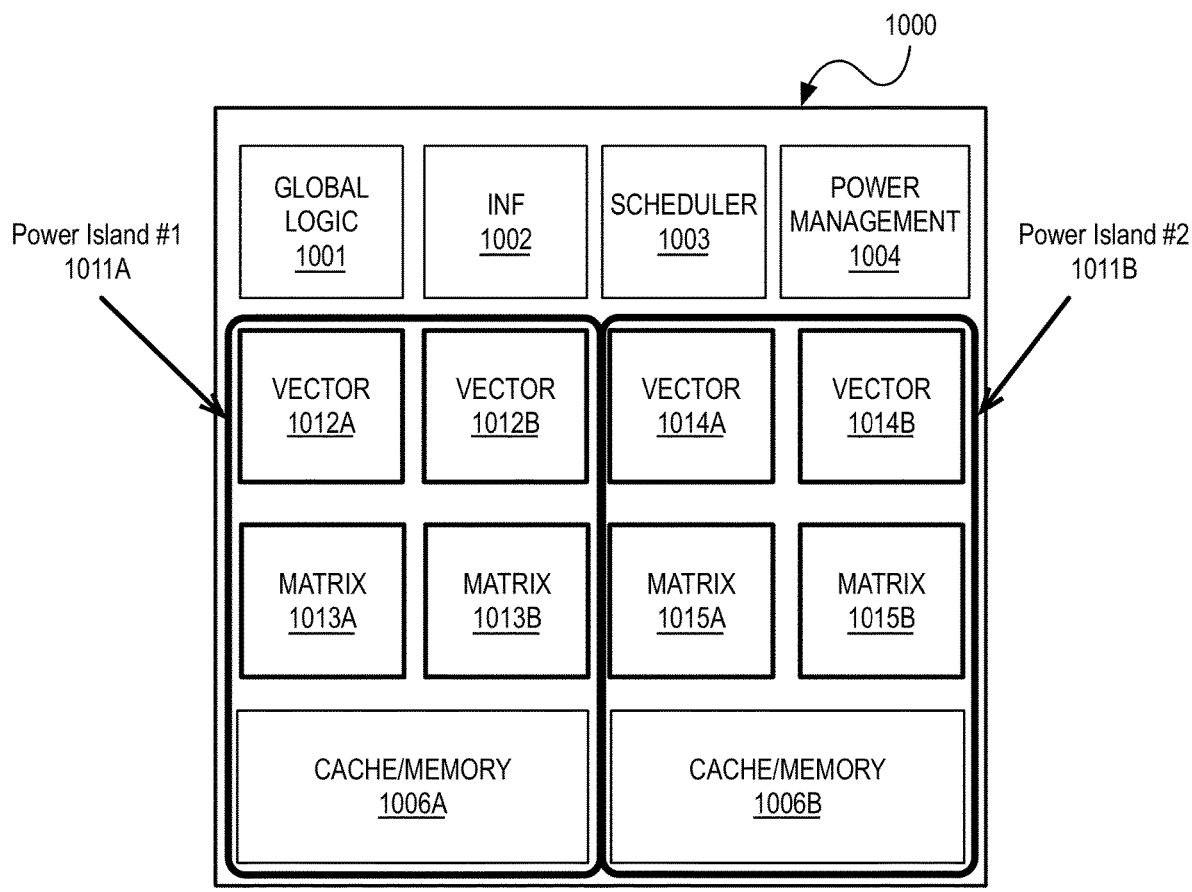
FIG. 10A-10C illustrates granular dynamic voltage and frequency scaling in a chiplet SoC architecture, according to an embodiments.
Figure 10B:
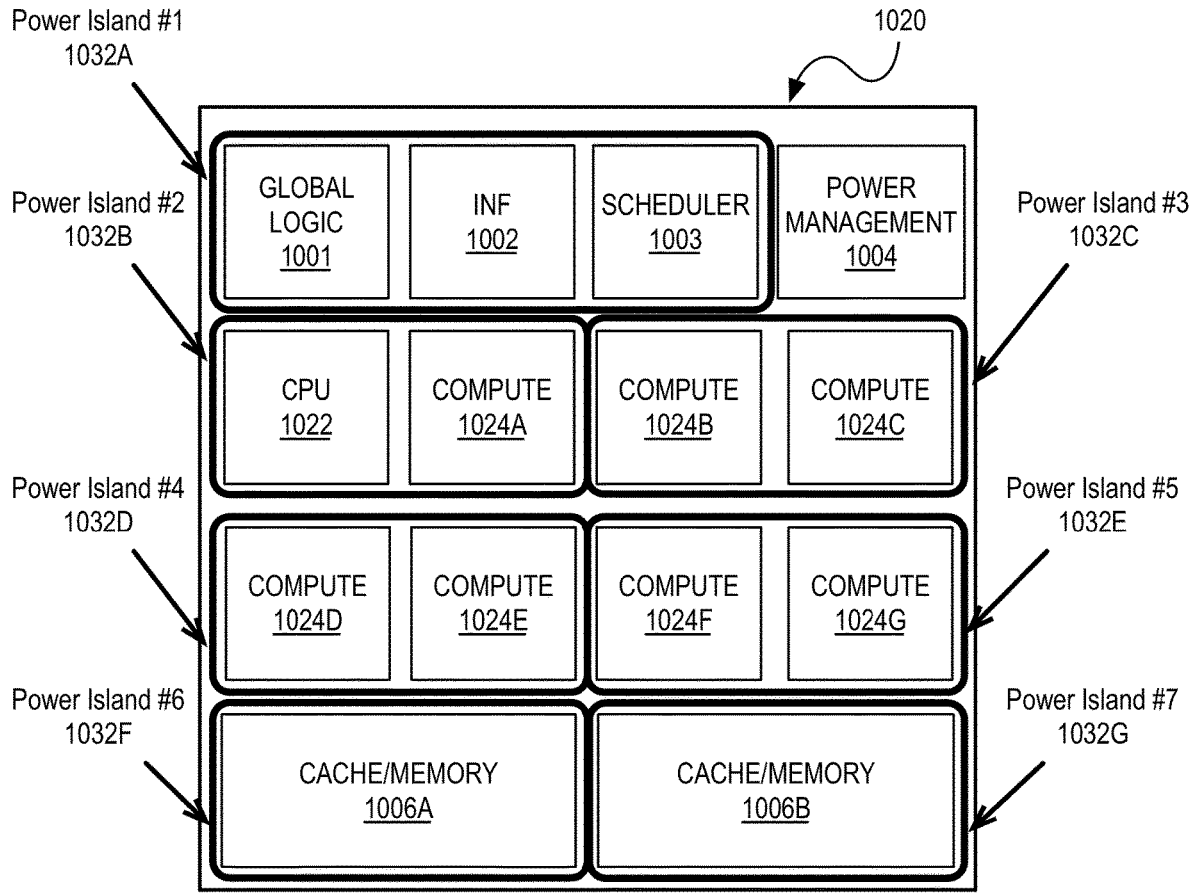
Figure 10C:
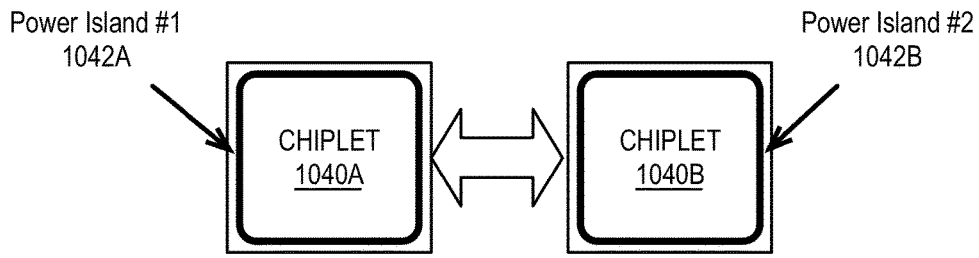

FIG. 10A-10C illustrate granular GPU DVFS in a chiplet SoC architecture, according to an embodiments. The chiplet SoC architecture enables a graphics or parallel processor that comprises one or more base dies or base chiplet dies that are populated with multiple chiplets. The chiplet SoC architecture enables a graphics processor in which discrete functionality is disaggregated into separate chiplets, as in FIG. 10A. The chiplet SoC architecture also enables a compute accelerator including a general-purpose processor and vector and/or matrix processors are distributed across multiple chiplets as in FIG. 10B. The chiplet SoC architecture also enables a graphics processor or compute accelerator SoC where each chiplet may provide functionality of an entire graphics processor or compute accelerator SoC, as in FIG. 10C.

As shown in FIG. 10A, in one embodiment discrete functionality of a graphics processor 1000 can be disaggregated into separate chiplets, such that separate chiplets are used for global logic 1001, interface logic 1002, scheduler logic 1003, and power management logic 1004. In one embodiment, the power management logic 1004 may be included in the chiplet used for the global logic 1001. In one embodiment, each of the global logic 1001, interface logic 1002, scheduler logic 1003, and power management logic 1004 may reside on a single chiplet. In one embodiment, the global logic 1001, interface logic 1002, scheduler logic 1003, and power management logic 1004 may be tied to overall device power that is active whenever the device is active.

In one embodiment, a first power island 1011A can include cache and/or memory chiplets 1006A, a first group of chiplets 1012A-1012B that include vector engines 502 and a second group of chiplets 1013A-1013B that include matrix engines 503. A second power island 1011B can include cache and/or memory chiplets 1006B, a third group of chiplets 1014A-1014B that include vector engines 502 and a second group of chiplets 1015A-1015B that include matrix engines 503. The chiplets within the power islands 1011A-1011B can be separately scaled. In one embodiment, while the power islands 1011A-1011B are active, voltage-regulated subdomains associated with the matrix chiplets 1013A-1013B, 1015A-1015B can disable the matrix engines within those chiplets when matrix workloads are not being processed.

As shown in FIG. 10B, a parallel processor 1020 may be disaggregated into separate chiplets that each provide distinct functionality for the parallel processor 1020. The parallel processor 1020 may be similar to the graphics processor 1000 of FIG. 10A, but with specific graphics pipeline functionality replaced with additional compute functionality (compute chiplet 1024A-1024G) that is used to perform general-purpose graphics processing operations. The parallel processor 1020 can include one or more general-purpose processor chiplets (e.g., CPU 1022), which can perform operations of one or more general-purpose processor cores as described herein. In one embodiment, the CPU 1022 of the general-purpose processor chiplet may act as a standalone CPU. In such embodiment, the global logic 1001 can include boot logic to enable the general-purpose processor chiplet to act as a bootable CPU. In one embodiment, a general-purpose processor chiplet can act as an offload processor that accept workloads dispatched from a host processor to which the exemplary modular parallel processor 1020 is coupled with via the interface logic 1002. Scheduler logic 1003 can include a microcontroller or low power processor that executes software or firmware that is capable of performing scheduling and dispatch operations for CPU 1022 and/or compute chiplets 1024A-1024G. In one embodiment, the CPU 1022 may also dispatch workloads to the compute chiplets 1024A-1024G and the compute chiplets 1024A-1024G can dispatch workloads to the CPU 1022. Each compute chiplet 1024A-1024G can include a plurality of vector engines 502 as in FIG. 5B and a plurality of matrix engines 503 as in FIG. 5C.

The parallel processor 1020 may be configured with multiple power islands 1032A-1032F. A first power island 1032A can include the global logic 1001, interface logic 1002, scheduler logic 1003, which may reside on one or more chiplets associated with the first power island 1032A. Power management logic 1004 that is tied to device power, or an always-on power domain can manage the voltages and frequencies of the various power islands 1032A-1032F. The logic units that reside within the various power islands 1032A-1032F can be determined based on one or more power chunking characteristics that are used to normalize power draw across the parallel processor 1020.

The chiplets of the parallel processor 1020 can be arranged into multiple chunks depending one or more chunking characteristics associated with a chunking architecture. The chunking architecture enables multiple heterogenous or homogenous chiplets to be grouped into a chunk of physically contiguous chiplets. For example, homogenous chiplets with different execution core counts to be grouped into chunks of chiplets, where each chunk of chiplets has a uniform number of execution cores. Additionally or alternatively, the chunking architecture enables heterogenous chiplets with different power requirements to be grouped into chunks that have uniform or pre-determined power delivery requirements. Power delivery can then be configured on a per-chunk instead of a per-chiplet basis. Each chunk can then be associated with a separate power island, such that the chiplets and their associated logic units can have their voltage and frequency scaled independently of other chunks.

In one embodiment, the first power island 1032A can be associated with a first chiplet chunk can include the global logic 1001, interface logic 1002, and scheduler logic 1003, which may be grouped for power delivery purposes. Various chunks may be created among the CPU 1022 and the various compute units 1505A-1505G. For example, a second power island 1032B can include the CPU 1022 and a first compute chiplet 1024A. The CPU 1022 may also reside on the first compute chiplet 1024A. Chiplet chunks be created among compute chiplets 1024B-1024G to normalize the number of vector or matrix engines within each chunk. Additionally, compute chiplets 1024B-1024G may be tested and sorted according to leakage power, maximum operational frequency, minimum voltage, and the number and type of test failures. The tested and sorted chiplets can then be paired to create chunks having uniform power and thermal dissipation requirements. The separate chiplet chunks may reside on separate power islands 1032C-1032E to enable independent voltage and frequency scaling for each chunk. The different power islands 1032C-1032E can be independently managed according to the thermal and frequency limits determined for the logic units within an associated chunk, such that one group of compute chiplets (e.g., compute chiplets 1024B-1024C) associated with the third power island 1032C may be allowed to reach a higher maximum frequency than another group of chiplets (e.g., compute chiplets 1024D-1024E) associated with a fourth power island 1032D.

The cache and/or memory chiplets that provide the set of cache/memory units 1006A-1006B may reside on separate power islands 1032F-1032G. Alternatively, the cache/memory units 1006A-1006B may reside on a shared power island.

As shown in FIG. 10C, graphics processor can be constructed from separate chiplets 1040A-1040B, which can each provide an SoC or a tile of graphics processing engines or compute engines, such as in FIG. 3B-3C. The chiplets 1040A-1040B can couple via a die-to-die interconnect within one or more base dies to which the chiplets 1040A-1040B are mounted. In one embodiment, each of the chiplets 1040A-1040B is a separate power island 1042A-1042B, with the first power island 1042A having a separately controllable voltage and frequency relative to the second power island 1042B. In one embodiment, either of the power islands 1042A-1042B may be disabled while the other power island remains active. Scheduling of workloads can be disabled for a disabled power island until a maximum frequency or utilization threshold is reached for the active power island. For example, a first power island 1042A and a first chiplet 1040A may be active, while a second power island 1042B is disabled, causing the second chiplet 1040B to be disabled. When the occupancy for the first chiplet 1040A exceeds a threshold, the second power island 1042B may be enabled and the second chiplet 1040B may become active and configured for workload execution. In one embodiment, instead of disabling the second power island 1042B, a low power state can be enabled for the second power island 1042B, enabling the second chiplet 1040B to remain in a fast-resume standby state until needed. In one embodiment, one or more voltage regulated subdomains may be enabled within the power respective power islands 1042A-1042B to enable individual components to be selectively disabled or throttled while the constituent chiplets 1040A-1040B are active.

Figure 11A:
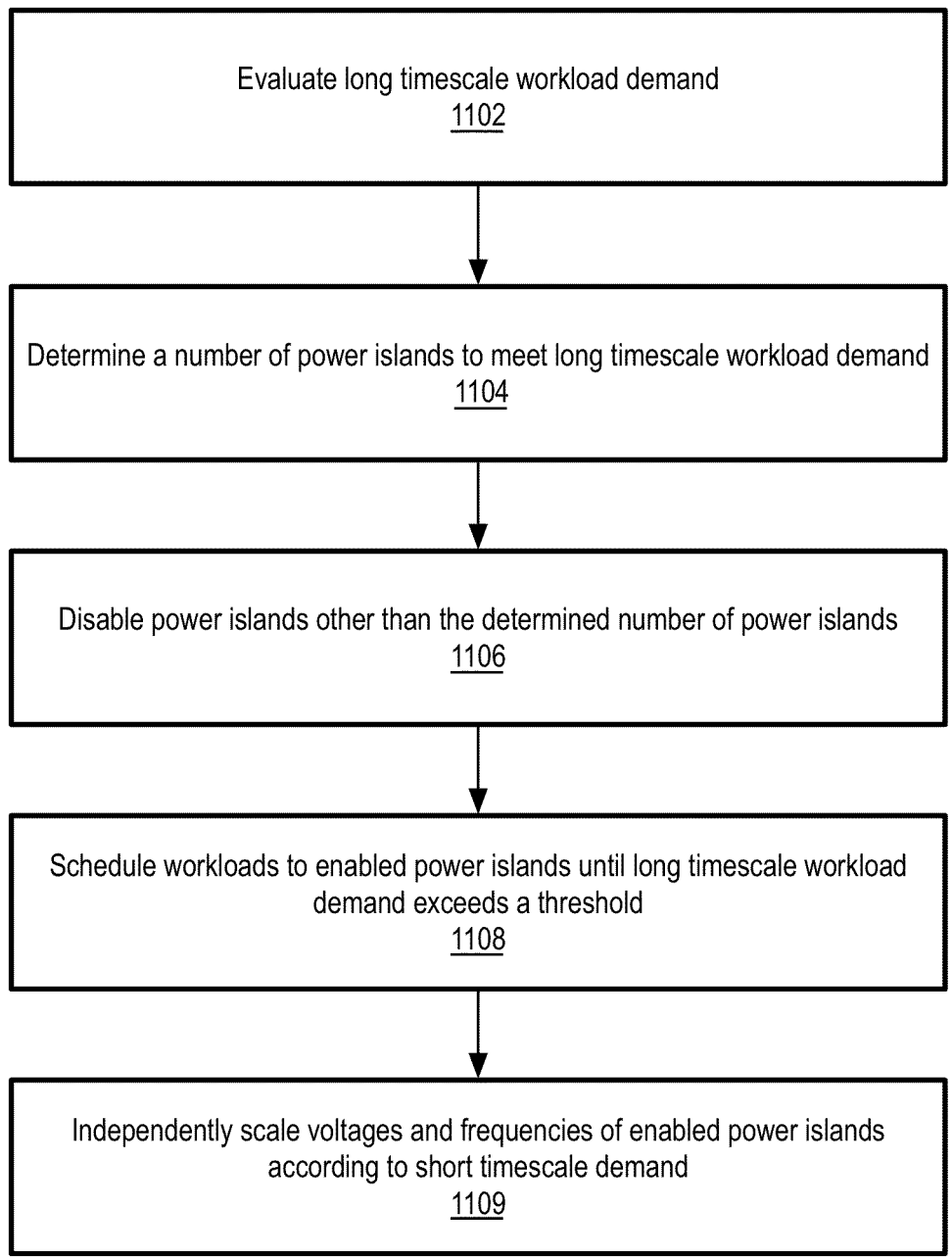
FIG. 11A-11B illustrate methods of granular dynamic voltage and frequency scaling in a graphics processor and/or chiplet-based SoC, according to an embodiment.
Figure 11B:
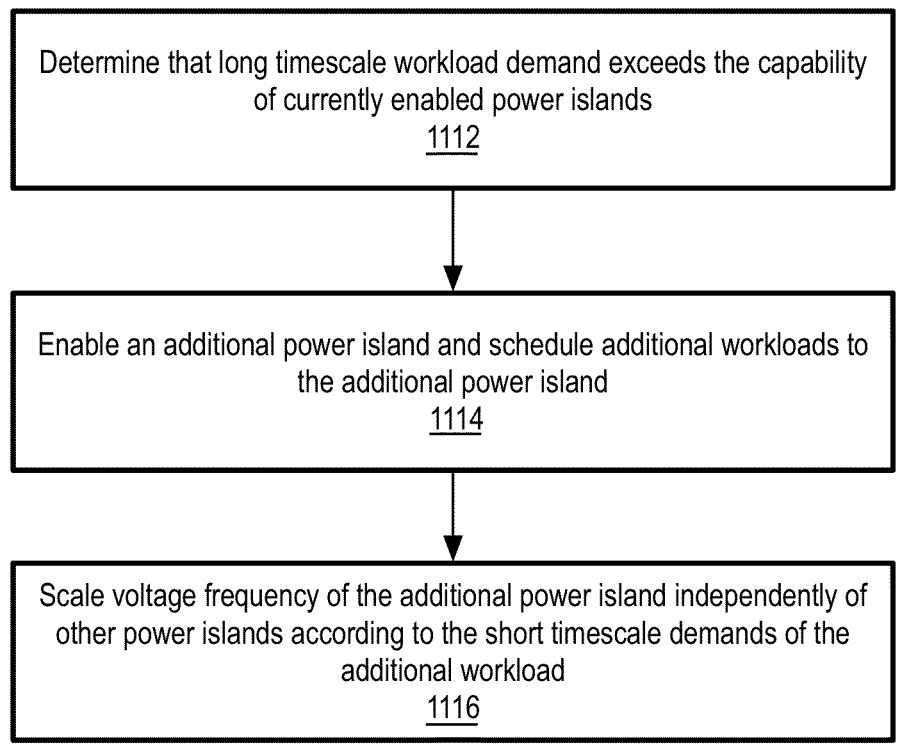

FIG. 11A-11B illustrate methods of granular dynamic voltage and frequency scaling in a graphics processor and/or chiplet-based SoC, according to an embodiment. FIG. 11A illustrates a method 1100 of reducing power consumption by limiting workload execution to a subset of a graphics processor or SoC. FIG. 11B illustrates a method 1110 of scaling the number of available power islands according to an increase in workload demand. The methods 1100, 1110 may be implemented via control and scheduling logic in concert with power management logic. In one embodiment, the methods may be implemented via control and/or scheduling logic within, for example, the graphics microcontroller 233 of FIG. 2B, or the graphics microcontroller 1315 of FIG. 13. Control and scheduling logic can manage granular dynamic voltage and frequency scaling on short timescales and long timescales. A long timescale can correspond to the execution time of multiple workloads. A short timescale can correspond to intra-workload timeframes. The specific duration of a short timeframe can also be a function of the speed at which voltage and frequency is evaluated and scaled by the processor.

As shown in FIG. 11A, control and scheduling logic can evaluate a long timescale workload demand for a graphics and/or parallel processor (1102). The long timescale workload demand can include workloads (e.g., command buffers) that are currently scheduled, have been scheduled recently, and that are anticipated to be scheduled, for example, based on the number and types of applications and associated contexts. When the graphics processor is partitioned for workload isolation in a multi-tenant, virtualized, or containerized environment, the long timescale workload demand can be a function of the number of occupied partitions.

The control and scheduling logic can determine a number of power islands to meet long timescale workload demand (1104). The number of power islands can be determined in part based on, for example, the number of occupied partitions when the graphics processor is in a partitioned configuration. The minimum number of power islands can also be determined based on the number of graphics core clusters or chiplets associated respectively with each power island, the number of execution threads supported by respectively those graphics core clusters, and/or the compute or render throughput associated respectively with those graphics core clusters. For example, for a given workload, a fewer number of power islands can be used if those power islands contain, relative to another power island equipped graphics processor, a large number of graphics core clusters, or those clusters contain graphics cores with more powerful compute or 3D processing resources.

The control and scheduling logic can then disable power islands other than the minimum number of power islands (1106). For example, when in a partitioned configuration, power islands associated with unused partitions can be disabled. When overall demand is low, such as when the graphics processor is in an idle state, all but one power island can be disabled if a display device is enabled, while most or all power islands can be disabled if a display device is not attached to the graphics processor or the display device is in a low power state.

When power islands are disabled due to long timescale workload demand conditions, the control and scheduling logic can schedule workloads to enabled power islands until long timescale workload demand exceeds a threshold (1108). Until an increase in workload demand occurs, the graphics processor can operate with a reduced number of enabled power islands to reduce the power consumption of the graphics device. The control and scheduling logic can independently scale voltages and frequencies of power islands according to short timescale demand (1109). Specifically, the subset of active power islands may be allowed to boost to high voltages and frequencies to more rapidly complete assigned workloads, while maintaining the disabled power islands in a zero or low voltage state. This configuration allows the limited number of active workloads to be executed with sufficient performance, while limiting overall static power consumption. The overall power consumption can be reduced below that which would have occurred if the entire graphics processor were active but executing workloads at reduced voltage and frequency. Furthermore, if the graphics processor is partitioned for use in a multi-tenant, virtualized, or containerized configuration, occupied partitions may be allowed operate at or above the maximum voltage and/or frequency that is available when all power islands are enabled.

As shown in FIG. 11B, the control and scheduling logic can determine that long timescale workload demand exceeds the capability of the currently enabled power islands (1112). This determination can be made, for example, if the enabled power islands are operating at a maximum sustainable voltage and/or frequency for greater than a threshold period of time. This determination can also be made in the event of a significant change in operational condition of the graphics processor, such as if a hotspot limit is reached for a power island and thermal rebalancing becomes necessary. This determination can also be made in the event of a significant change in the usage condition of the graphics processor, such as when an application is launched that will make significant usage of graphics processor resources or if a previously unused partition is assigned to a virtual machine or container. When the control and scheduling logic determines that the long timescale workload demand exceeds (or will exceed) the capability of the currently enabled power islands, the control and scheduling logic can enable an additional power island (or islands) and schedule additional workloads to the additional power island(s) (1114). The control and scheduling logic can then scale the voltage frequency of the additional power island(s) independently of other power islands according to the short timescale demands of the additional workload. For example, the voltage and frequency of power islands that include graphics core clusters that are executing older workloads may be maintained at the highest states, while the voltage and frequency of the newly enabled power island can scale according to the demands of the new workload.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 12A:
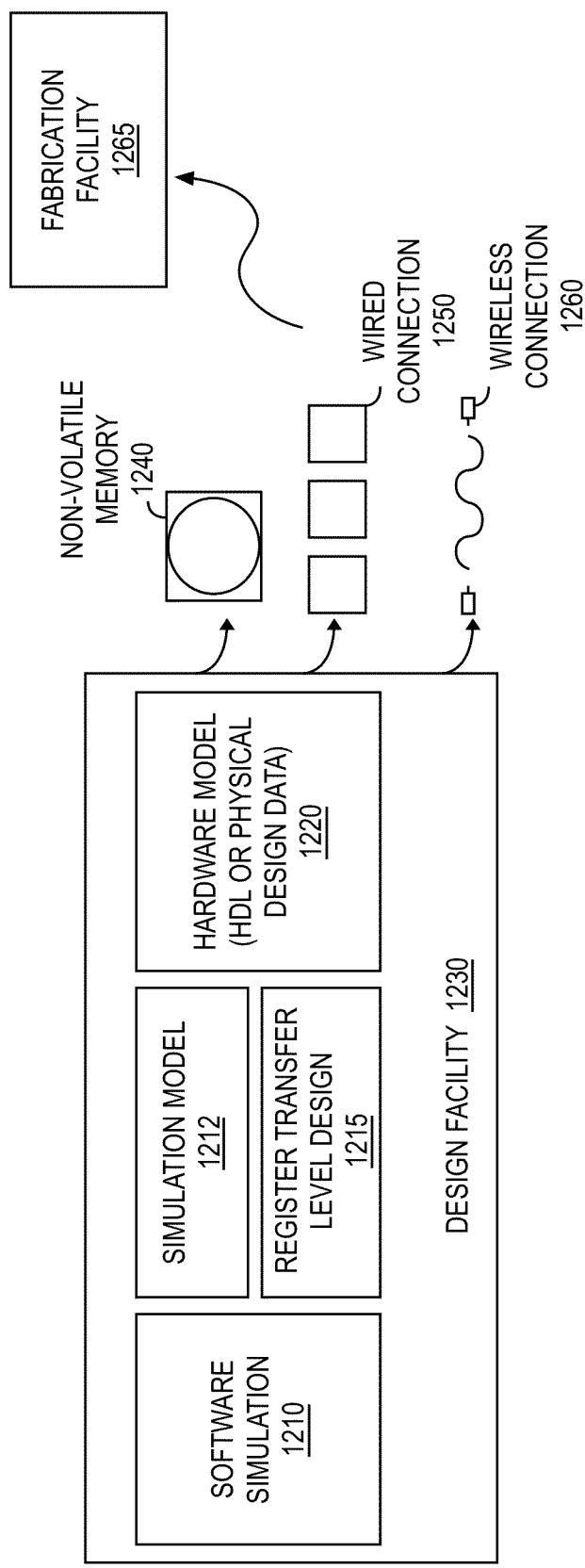
FIG. 12A-12D illustrate an integrated circuit package assembly, according to an embodiment.

FIG. 12A is a block diagram illustrating an IP core development system 1200 that may be used to manufacture an integrated circuit to perform operations according to an embodiment. The IP core development system 1200 may be used to generate modular, re-usable designs that can be incorporated into a larger design or used to construct an entire integrated circuit (e.g., an SOC integrated circuit). A design facility 1230 can generate a software simulation 1210 of an IP core design in a high-level programming language (e.g., C/C++). The software simulation 1210 can be used to design, test, and verify the behavior of the IP core using a simulation model 1212. The simulation model 1212 may include functional, behavioral, and/or timing simulations. A register transfer level (RTL) design 1215 can then be created or synthesized from the simulation model 1212. The RTL design 1215 is an abstraction of the behavior of the integrated circuit that models the flow of digital signals between hardware registers, including the associated logic performed using the modeled digital signals. In addition to an RTL design 1215, lower-level designs at the logic level or transistor level may also be created, designed, or synthesized. Thus, the particular details of the initial design and simulation may vary.

The RTL design 1215 or equivalent may be further synthesized by the design facility into a hardware model 1220, which may be in a hardware description language (HDL), or some other representation of physical design data. The HDL may be further simulated or tested to verify the IP core design. The IP core design can be stored for delivery to a $3^{rd}$ party fabrication facility 1265 using non-volatile memory 1240 (e.g., hard disk, flash memory, or any non-volatile storage medium). Alternatively, the IP core design may be transmitted (e.g., via the Internet) over a wired connection 1250 or wireless connection 1260. The fabrication facility 1265 may then fabricate an integrated circuit that is based at least in part on the IP core design. The fabricated integrated circuit can be configured to perform operations in accordance with at least one embodiment described herein.

Figure 12B:
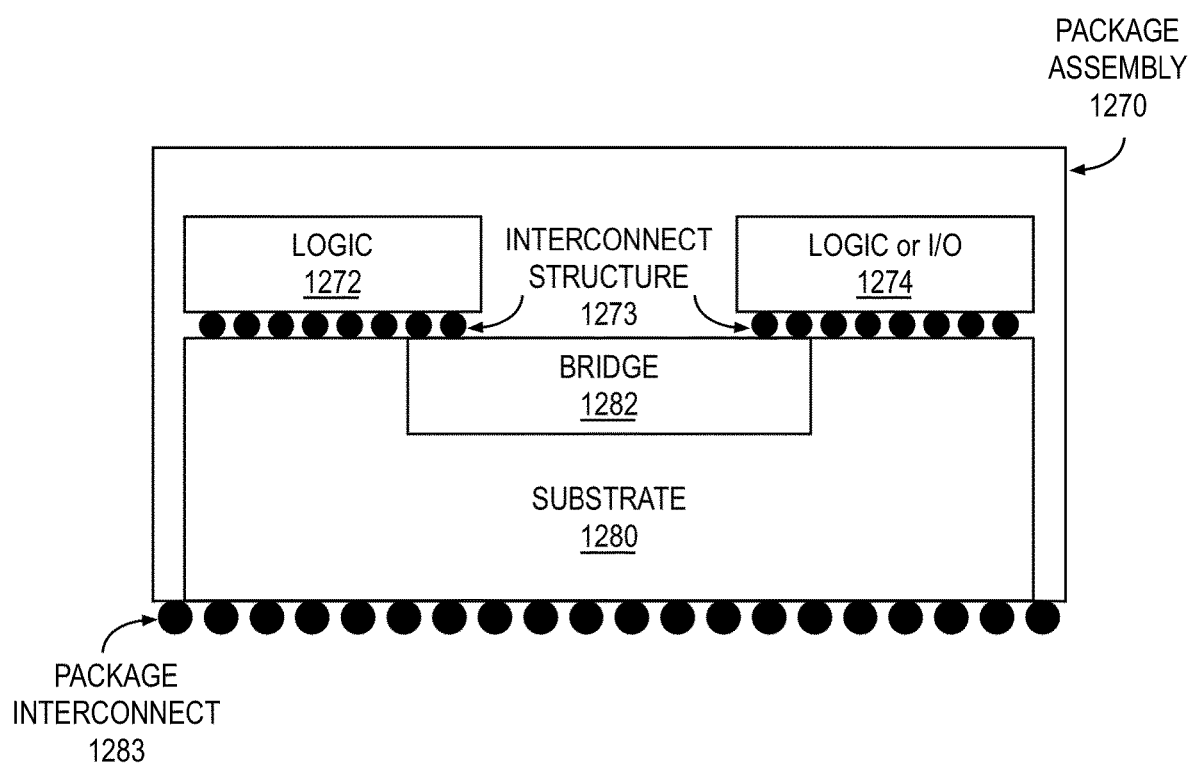
Figure 12C:
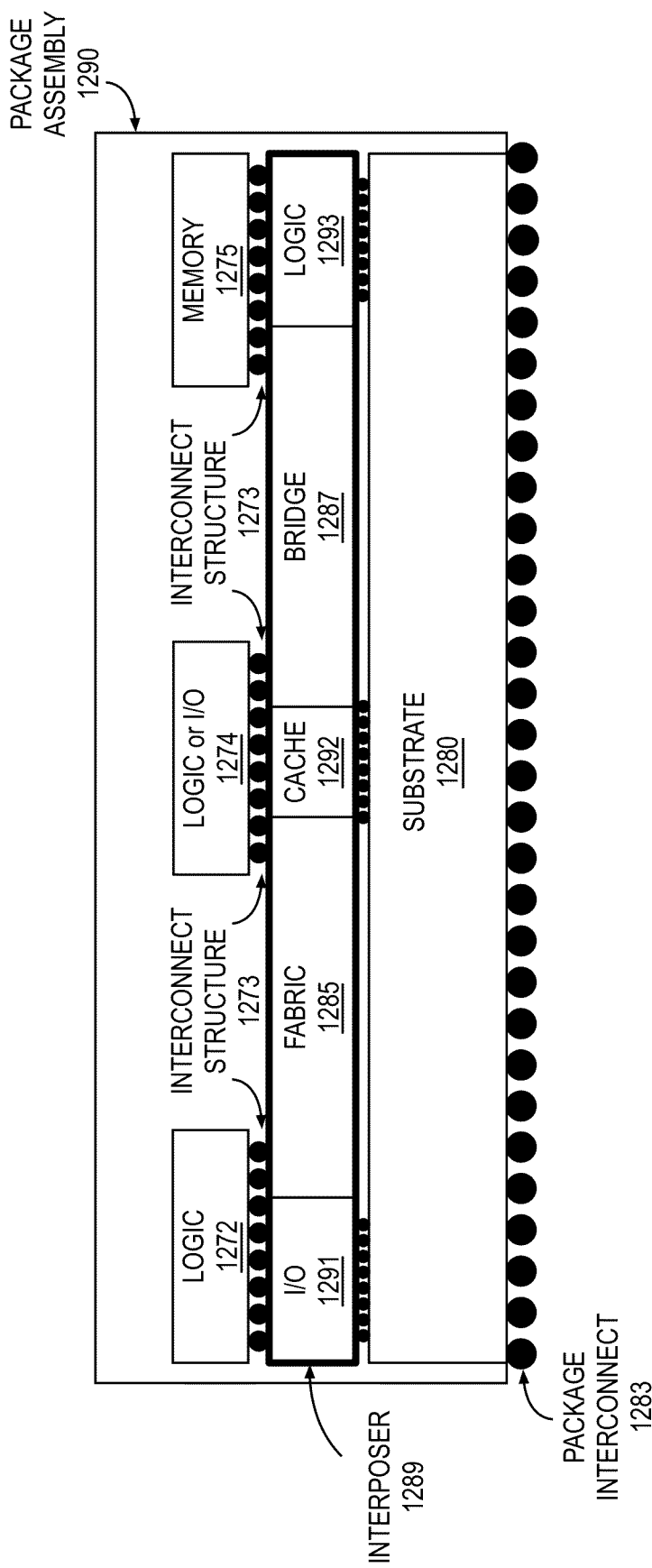

FIG. 12B illustrates a cross-section side view of an integrated circuit package assembly 1270, according to some embodiments described herein. The integrated circuit package assembly 1270 illustrates an implementation of one or more processor or accelerator devices as described herein. The package assembly 1270 includes multiple units of hardware logic 1272, 1274 connected to a substrate 1280. The logic 1272, 1274 may be implemented at least partly in configurable logic or fixed-functionality logic hardware and can include one or more portions of any of the processor core(s), graphics processor(s), or other accelerator devices described herein. Each unit of logic 1272, 1274 can be implemented within a semiconductor die and coupled with the substrate 1280 via an interconnect structure 1273. The interconnect structure 1273 may be configured to route electrical signals between the logic 1272, 1274 and the substrate 1280, and can include interconnects such as, but not limited to bumps or pillars. In some embodiments, the interconnect structure 1273 may be configured to route electrical signals such as, for example, input/output (I/O) signals and/or power or ground signals associated with the operation of the logic 1272, 1274. In some embodiments, the substrate 1280 is an epoxy-based laminate substrate. The substrate 1280 may include other suitable types of substrates in other embodiments. The package assembly 1270 can be connected to other electrical devices via a package interconnect 1283. The package interconnect 1283 may be coupled to a surface of the substrate 1280 to route electrical signals to other electrical devices, such as a motherboard, other chipset, or multi-chip module.

In some embodiments, the units of logic 1272, 1274 are electrically coupled with a bridge 1282 that is configured to route electrical signals between the logic 1272, 1274. The bridge 1282 may be a dense interconnect structure that provides a route for electrical signals. The bridge 1282 may include a bridge substrate composed of glass or a suitable semiconductor material. Electrical routing features can be formed on the bridge substrate to provide a chip-to-chip connection between the logic 1272, 1274.

Although two units of logic 1272, 1274 and a bridge 1282 are illustrated, embodiments described herein may include more or fewer logic units on one or more dies. The one or more dies may be connected by zero or more bridges, as the bridge 1282 may be excluded when the logic is included on a single die. Alternatively, multiple dies or units of logic can be connected by one or more bridges. Additionally, multiple logic units, dies, and bridges can be connected together in other possible configurations, including three-dimensional configurations.

FIG. 12C illustrates a package assembly 1290 that includes multiple units of hardware logic chiplets connected to a substrate 1280. A graphics processing unit, parallel processor, and/or compute accelerator as described herein can be composed from diverse silicon chiplets that are separately manufactured. A diverse set of chiplets with different IP core logic from multiple vendors can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 1290 can include components and chiplets that are interconnected by a fabric 1285 and/or one or more bridges 1287. The chiplets within the package assembly 1290 may have a 2.5D arrangement using Chip-on-Wafer-on-Substrate stacking in which multiple dies are stacked side-by-side on a silicon interposer 1289 that couples the chiplets with the substrate 1280. The substrate 1280 includes electrical connections to the package interconnect 1283. In one embodiment the silicon interposer 1289 is a passive interposer that includes through-silicon vias (TSVs) to electrically couple chiplets within the package assembly 1290 to the substrate 1280. In one embodiment, silicon interposer 1289 is an active interposer that includes embedded logic in addition to TSVs. In such embodiment, the chiplets within the package assembly 1290 are arranged using 3D face to face die stacking on top of the active silicon interposer 1289. The silicon interposer 1289 can include hardware logic for I/O 1291, cache memory 1292, and other hardware logic 1293, in addition to interconnect fabric 1285 and a silicon bridge 1287. The fabric 1285 enables communication between the various logic chiplets 1272, 1274 and the logic for I/O 1291, and other hardware logic 1293 within the active silicon interposer 1289. The fabric 1285 may be an NoC interconnect or another form of packet switched fabric that switches data packets between components of the package assembly. For complex assemblies, the fabric 1285 may be a dedicated chiplet enables communication between the various hardware logic of the package assembly 1290.

Bridge structures 1287 within the active silicon interposer 1289 may be used to facilitate a point-to-point interconnect between, for example, logic or I/O chiplets 1274 and memory chiplets 1275. In some implementations, bridge structures 1287 may also be embedded within the substrate 1280. The hardware logic chiplets can include special purpose hardware logic chiplets 1272, logic or I/O chiplets 1274, and/or memory chiplets 1275. The hardware logic chiplets 1272 and logic or I/O chiplets 1274 may be implemented at least partly in configurable logic or fixed-functionality logic hardware and can include one or more portions of any of the processor core(s), graphics processor(s), parallel processors, or other accelerator devices described herein. The memory chiplets 1275 can be DRAM (e.g., GDDR, HBM) memory or cache (SRAM) memory. Cache memory 1292 within the active interposer 1289 (or substrate 1280) can act as a global cache for the package assembly 1290, part of a distributed global cache, or as a dedicated cache for the fabric 1285.

Each chiplet can be fabricated as separate semiconductor die and coupled with a base die that is embedded within or coupled with the substrate 1280. The coupling with the substrate 1280 can be performed via an interconnect structure 1273. The interconnect structure 1273 may be configured to route electrical signals between the various chiplets and logic within the substrate 1280. The interconnect structure 1273 can include interconnects such as, but not limited to bumps or pillars. In some embodiments, the interconnect structure 1273 may be configured to route electrical signals such as, for example, input/output (I/O) signals and/or power or ground signals associated with the operation of the logic, I/O, and memory chiplets. In one embodiment, an additional interconnect structure couples the active interposer 1289 with the substrate 1280.

In some embodiments, the substrate 1280 is an epoxy-based laminate substrate. The substrate 1280 may include other suitable types of substrates in other embodiments. The package assembly 1290 can be connected to other electrical devices via a package interconnect 1283. The package interconnect 1283 may be coupled to a surface of the substrate 1280 to route electrical signals to other electrical devices, such as a motherboard, other chipset, or multi-chip module.

In some embodiments, a logic or I/O chiplet 1274 and a memory chiplet 1275 can be electrically coupled via a bridge 1287 that is configured to route electrical signals between the logic or I/O chiplet 1274 and a memory chiplet 1275. The bridge 1287 may be a dense interconnect structure that provides a route for electrical signals. The bridge 1287 may include a bridge substrate composed of glass or a suitable semiconductor material. Electrical routing features can be formed on the bridge substrate to provide a chip-to-chip connection between the logic or I/O chiplet 1274 and a memory chiplet 1275. The bridge 1287 may also be referred to as a silicon bridge or an interconnect bridge. For example, the bridge 1287, in some embodiments, is an Embedded Multi-die Interconnect Bridge (EMIB). In some embodiments, the bridge 1287 may simply be a direct connection from one chiplet to another chiplet.

Figure 12D:
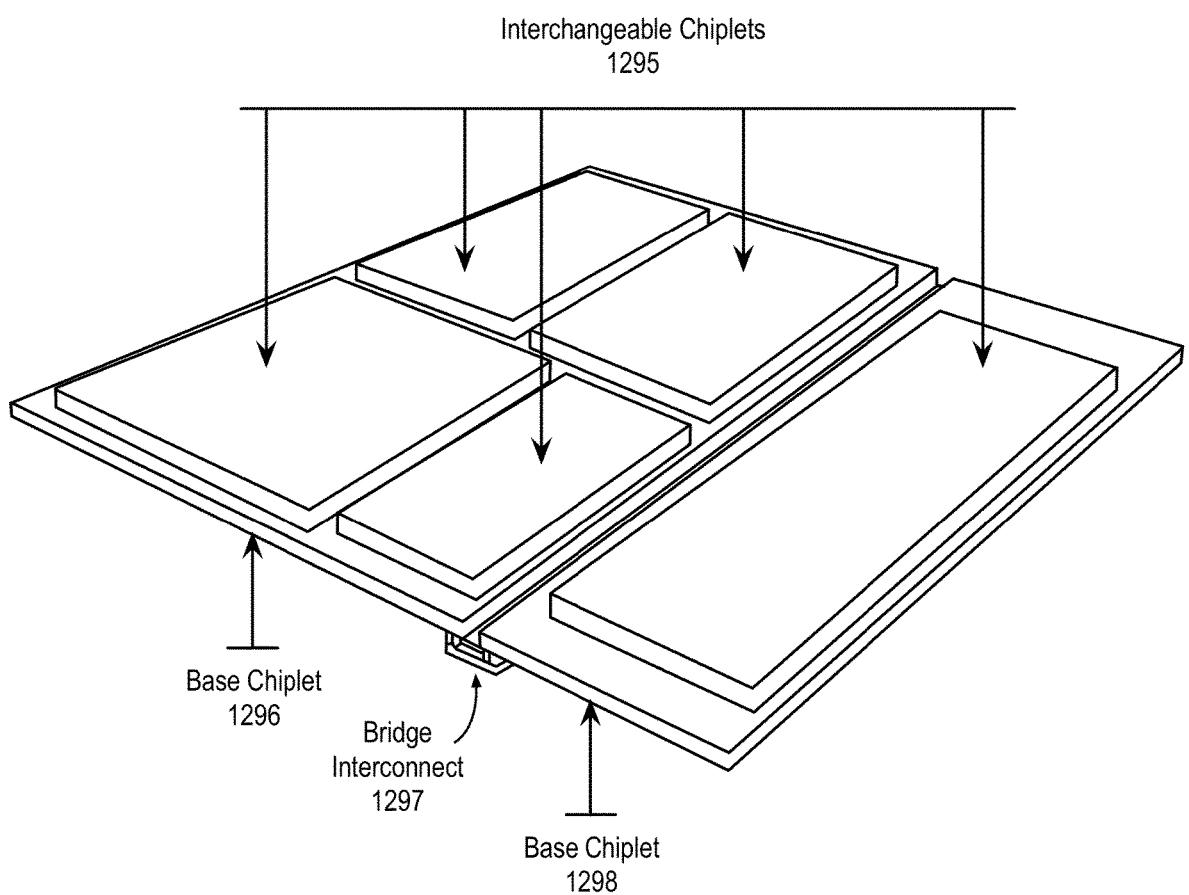

FIG. 12D illustrates a package assembly 1294 including interchangeable chiplets 1295, according to an embodiment. The interchangeable chiplets 1295 can be assembled into standardized slots on one or more base chiplets 1296, 1298. The base chiplets 1296, 1298 can be coupled via a bridge interconnect 1297, which can be similar to the other bridge interconnects described herein and may be, for example, an EMIB. In one embodiment, the bridge interconnect 1297 may also be an interposer. The one or more base chiplets 1296, 1298, in one embodiment, are interposers that are positioned on top of a package substrate, such as the interposer 1289 of FIG. 12C. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/ cache.

In one embodiment, SRAM and power delivery circuits can be fabricated into one or more of the base chiplets 1296, 1298, which can be fabricated using a different process technology relative to the interchangeable chiplets 1295 that are stacked on top of the base chiplets. For example, the base chiplets 1296, 1298 can be fabricated using a larger process technology, while the interchangeable chiplets can be manufactured using a smaller process technology. One or more of the interchangeable chiplets 1295 may be memory (e.g., DRAM) chiplets. Different memory densities can be selected for the package assembly 1294 based on the power, and/or performance targeted for the product that uses the package assembly 1294. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Additional Exemplary Computing Device

Figure 13:
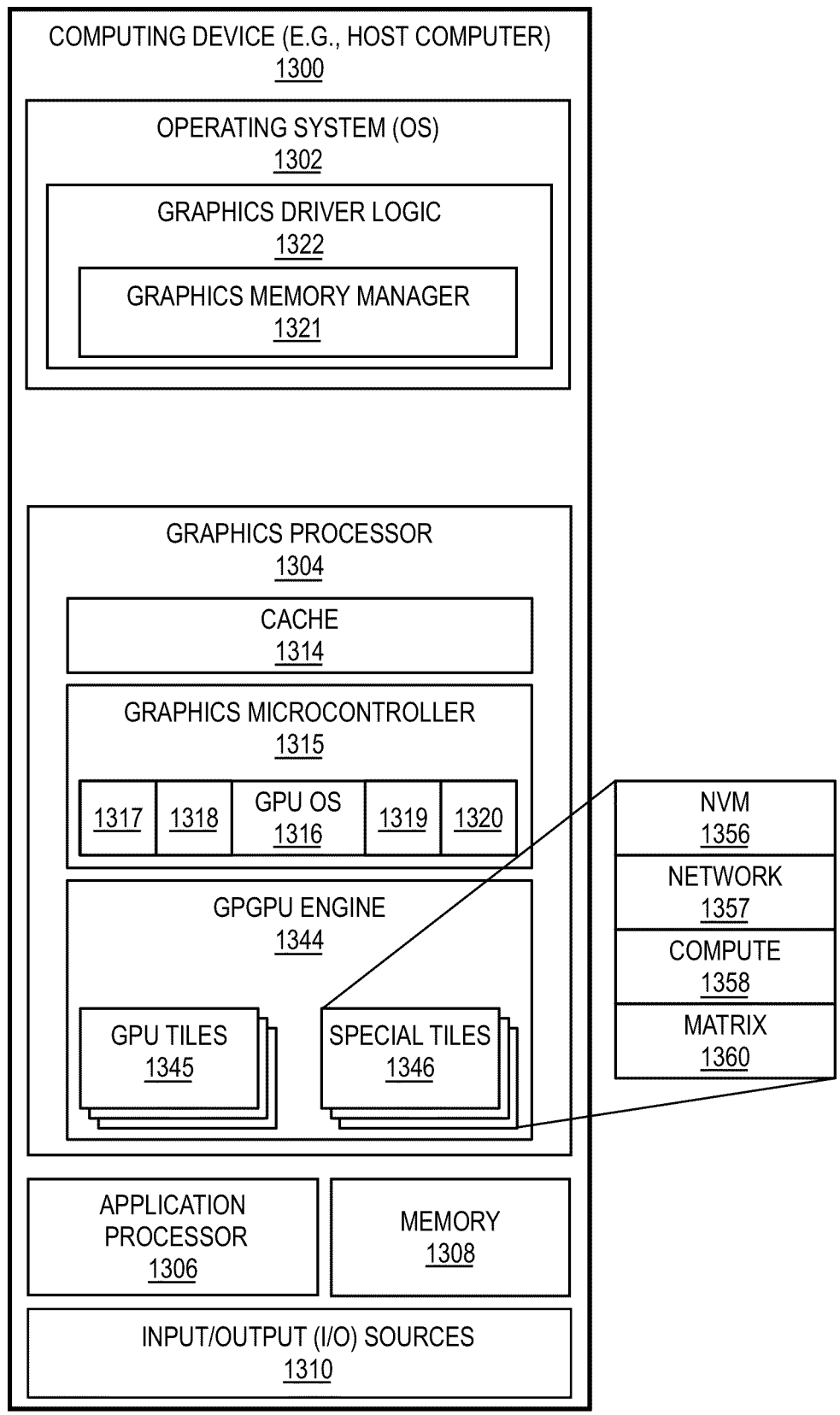
FIG. 13 is a block diagram of a computing device including a graphics processor, according to an embodiment.

FIG. 13 is a block diagram of a computing device 1300 including a graphics processor 1304, according to an embodiment. Versions of the computing device 1300 may be or be included within a communication device such as a set-top box (e.g., Internet-based cable television set-top boxes, etc.), global positioning system (GPS)-based devices, etc. The computing device 1300 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 1300 includes a mobile computing device employing an integrated circuit ("IC"), such as system on a chip ("SoC" or "SOC"), integrating various hardware and/or software components of computing device 1300 on a single chip. The computing device 1300 can be a computing device such as the processing system 100 as in of FIG. 1.

The computing device 1300 includes a graphics processor 1304. The graphics processor 1304 represents any graphics processor described herein. In one embodiment, the graphics processor 1304 includes a cache 1314, which can be a single cache or divided into multiple segments of cache memory, including but not limited to any number of L1, L2, L3, or L4 caches, render caches, depth caches, sampler caches, and/or shader unit caches. In one embodiment the cache 1314 may be a last level cache that is shared with the application processor 1306.

In one embodiment the graphics processor 1304 includes a graphics microcontroller that implements control and scheduling logic for the graphics processor. The control and scheduling logic can be firmware executed by the graphics microcontroller 1315. The firmware may be loaded at boot by the graphics driver logic 1322. The firmware may also be programmed to an electronically erasable programmable read only memory or loaded from a flash memory device within the graphics microcontroller 1315. The firmware may enable a GPU OS 1316 that includes device management logic 1317, device driver logic 1318, and a scheduler 1319. The GPU OS 1316 may also include a graphics memory manager 1320 that can supplement or replace the graphics memory manager 1321 within the graphics driver logic 1322.

The virtual memory address management for compression data described herein can be implemented, in various embodiments, by the graphics memory manager 1320 of the GPU OS 1316, the graphics memory manager 1321 within the graphics driver logic 1322, or another component of the GPU OS 1316 and/or graphics driver logic 1322.

The graphics processor 1304 also includes a GPGPU engine 1344 that includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources or performing general purpose computational operations in a heterogeneous processor. The processing resources of the GPGPU engine 1344 can be included within multiple tiles of hardware logic connected to a substrate, as illustrated in FIG. 12B-12D. The GPGPU engine 1344 can include GPU tiles 1345 that include graphics processing and execution resources, caches, samplers, etc. The GPU tiles 1345 may also include local volatile memory or can be coupled with one or more memory tiles, for example, as shown in FIG. 3B-3C.

The GPGPU engine 1344 can also include and one or more special tiles 1346 that include, for example, a non-volatile memory tile 1356, a network processor tile 1357, and/or a general-purpose compute tile 1358. The GPGPU engine 1344 also includes a matrix multiply accelerator 1360. The general-purpose compute tile 1358 may also include logic to accelerate matrix multiplication operations. The non-volatile memory tile 1356 can include non-volatile memory cells and controller logic. The controller logic of the non-volatile memory tile 1356 may be managed by the device management logic 1317 or the device driver logic 1318. The network processor tile 1357 can include network processing resources that are coupled to a physical interface within the input/output (I/O) sources 1310 of the computing device 1300. The network processor tile 1357 may be managed by one or more of device management logic 1317 or the device driver logic 1318. Any of the GPU tiles 1345 or one or more special tiles 1346 may include an active base with multiple stacked chiplets, as described herein.

The matrix multiply accelerator 1360 is a modular scalable sparse matrix multiply accelerator. The matrix multiply accelerator 1360 can includes multiple processing paths, with each processing path including multiple pipeline stages. Each processing path can execute a separate instruction. In various embodiments, the matrix multiply accelerator 1360 can have architectural features of any one of more of the matrix multiply accelerators described herein. For example, in one embodiment, the matrix multiply accelerator 1360 is a four-deep systolic array with a feedback loop that is configurable to operate with a multiple of four number of logical stages (e.g., four, eight, twelve, sixteen, etc.). In one embodiment the matrix multiply accelerator 1360 includes one or more instances of a two-path matrix multiply accelerator with a four stage pipeline or a four-path matrix multiply accelerator with a two stage pipeline. The matrix multiply accelerator 1360 can be configured to operate only on non-zero values of at least one input matrix. Operations on entire columns or submatrices can be bypassed where block sparsity is present. The matrix multiply accelerator 1360 can also include any logic based on any combination of these embodiments, and particularly include logic to enable support for random sparsity, according to embodiments described herein.

As illustrated, in one embodiment, and in addition to the graphics processor 1304, the computing device 1300 may further include any number and type of hardware components and/or software components, including, but not limited to an application processor 1306, memory 1308, and input/output (I/O) sources 1310. The application processor 1306 can interact with a hardware graphics pipeline, as illustrated with reference to FIG. 3A, to share graphics pipeline functionality. Processed data is stored in a buffer in the hardware graphics pipeline and state information is stored in memory 1308. The resulting data can be transferred to a display controller for output via a display device, such as the display device 318 of FIG. 3A. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 1306 can include one or processors, such as processor(s) 102 of FIG. 1 and may be the central processing unit (CPU) that is used at least in part to execute an operating system (OS) 1302 for the computing device 1300. The OS 1302 can serve as an interface between hardware and/or physical resources of the computing device 1300 and one or more users. The OS 1302 can include driver logic for various hardware devices in the computing device 1300. The driver logic can include graphics driver logic 1322, which can include the user mode graphics driver and/or kernel mode graphics driver. The graphics driver logic can include a graphics memory manager 1321 to manage a virtual memory address space for the graphics processor 1304.

It is contemplated that in some embodiments the graphics processor 1304 may exist as part of the application processor 1306 (such as part of a physical CPU package) in which case, at least a portion of the memory 1308 may be shared by the application processor 1306 and graphics processor 1304, although at least a portion of the memory 1308 may be exclusive to the graphics processor 1304, or the graphics processor 1304 may have a separate store of memory. The memory 1308 may comprise a pre-allocated region of a buffer (e.g., framebuffer); however, it should be understood by one of ordinary skill in the art that the embodiments are not so limited, and that any memory accessible to the lower graphics pipeline may be used. The memory 1308 may include various forms of random-access memory (RAM) (e.g., SDRAM, SRAM, etc.) comprising an application that makes use of the graphics processor 1304 to render a desktop or 3D graphics scene. A memory controller hub, such as memory controller 116 of FIG. 1, may access data in the memory 1308 and forward it to graphics processor 1304 for graphics pipeline processing. The memory 1308 may be made available to other components within the computing device 1300. For example, any data (e.g., input graphics data) received from various I/O sources 1310 of the computing device 1300 can be temporarily queued into memory 1308 prior to their being operated upon by one or more processor(s) (e.g., application processor 1306) in the implementation of a software program or application. Similarly, data that a software program determines should be sent from the computing device 1300 to an outside entity through one of the computing system interfaces, or stored into an internal storage element, is often temporarily queued in memory 1308 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 1310 may include one or more I/O devices that are implemented for transferring data to and/or from the computing device 1300 (e.g., a networking adapter); or, for a large-scale non-volatile storage within the computing device 1300 (e.g., SSD/HDD). User input devices, including alphanumeric and other keys, may be used to communicate information and command selections to graphics processor 1304. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 1300 may be employed to observe gestures, record audio and video and to receive and transmit visual and audio commands.

The I/O sources 1310 can include one or more network interfaces. The network interfaces may include associated network processing logic and/or be coupled with the network processor tile 1357. The one or more network interface can provide access to a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), $5^{th}$ Generation (5G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing devices described herein may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), Open Computing Language (OpenCL®), CUDA®, DirectX® 11, DirectX® 13, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

References herein to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present. Similarly, items listed in the form of "at least one of A, B, or C" can mean (A); (B); (C): (A and B); (B and C); or (A, B, and C).

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

Described herein are techniques to facilitate the partial powerdown of sub-components of an execution unit or other execution resource and/or graphics processing resource based on the compute requirements of a workload to be executed. Additionally, granular dynamic voltage and frequency scaling is enabled in which the voltage and frequency of groups of processing resources within a graphics processor can be separately scaled.

One embodiment provides a graphics processor having a processing resource including a plurality of components, the plurality of components including a vector engine and a matrix engine, each of the plurality of components associated with its own voltage regulated subdomain within a voltage domain. The graphics processor additionally includes circuitry coupled with the processing resource, the circuitry configured to receive a workload for execution; determine components of the processing resource to be used to execute the workload and reduce a frequency associated with a first component of the plurality of components in response to a determination that the first component is not to be used to execute the workload.

The circuitry can be configured to reduce a voltage associated with the first component, including reducing the voltage and frequency of the first component to zero to disable the first component. The circuitry can also increase the frequency of a second component of the plurality of components in response to a determination that the second component is to be used to execute the workload. The voltage of the second component can also be increased in accordance with the increase of frequency. The first component can include the matrix engine and the second component can include the vector engine, for example, when the workload to be executed does not include matrix operations. The processing resource can also include a ray tracing core and the first component can include the ray tracing core when ray tracing is not used for the workload. The processing resource can additionally include a video codec and the first component can include the video codec when the video codec will not be used for the workload. The circuitry can determine the components of the processing resource to be used to execute the workload based on a command buffer associated with the workload or a context type associated with the workload.

One embodiment provides an apparatus or electronic device having a plurality of processing resources including a first plurality of graphics cores associated with a first power island and a second plurality of graphics cores associated with a second power island. The apparatus additionally includes power management circuitry coupled with the plurality of processing resources, the power management circuitry configured to dynamically scale a voltage and frequency of the first power island independently of the voltage and frequency of the second power island. The apparatus can include a first graphics core cluster including the first plurality of graphics cores and a second graphics core cluster including the second plurality of graphics cores. The apparatus can also include a first chiplet including the first plurality of graphics cores and a second chiplet including the second plurality of graphics cores.

The apparatus can additionally include scheduler hardware coupled with the plurality of processing resources and the power management circuitry. The scheduler hardware can schedule workloads to the plurality of processing resources. In one embodiment, the scheduler hardware configured is to determine that commands associated with a first workload are to be scheduled to the first plurality of graphics cores associated with a first power island and are not to be scheduled to the second plurality of graphics cores. In response, the scheduler hardware can disable the second plurality of graphics cores via a request to the power management circuitry to disable the second power island.

The scheduler hardware configured can then schedule the commands associated with the first workload to the first plurality of graphics cores and, via the power management circuitry, dynamically adjust a voltage and frequency of the first plurality of graphics cores via the first power island while second power island is disabled. The power management circuitry can increase the voltage and frequency of the first plurality of graphics cores via the first power island while second power island is disabled, potentially up to a maximum configurable voltage and frequency for the first plurality of graphics cores. The scheduler hardware can also receive commands associated with a second workload for execution, determine that the commands associated with the second workload are to be scheduled to the second plurality of graphics cores, and then enable the second plurality of graphics cores via a request to the power management circuitry to enable the second power island. The scheduler hardware can schedule the commands associated with the second workload to the second plurality of graphics cores.

The power management circuitry can dynamically adjust a voltage and frequency of the second plurality of graphics cores via the second power island independently of the voltage and frequency of the first plurality of graphics cores. The voltage and frequency of the second plurality of graphics cores can be increased up to a maximum configurable voltage and frequency for the second plurality of graphics cores. The maximum configurable voltage and frequency for the second plurality of graphics cores can differ from the maximum configurable voltage and frequency of the first plurality of graphics cores.

One embodiment provides a graphics processor comprising a processing resource including a plurality of components, the plurality of components including a vector engine and a matrix engine, each of the plurality of components associated with a distinct voltage regulated subdomain of a voltage domain and circuitry coupled with the processing resource. The circuitry is configured to receive a workload for execution, determine, to execute the workload, a first frequency and a first voltage for a first component of the plurality of components, the first component associated with a graphics pipeline, determine, to execute the workload, a second frequency and a second voltage for a second component of the plurality of components, the second component associated with the graphics pipeline. The first frequency is less than the second frequency and the first voltage is less than the second voltage. The circuitry can then configure the first component with the first frequency and the first voltage and the second component with the second frequency and the second voltage.

One embodiment provides a method including evaluating, on a graphics processor, a workload demand for a first time scale, determining a number of processing resources to meet the workload demand, disabling a power island for a set of processing resources surplus to the workload demand, and scheduling workloads to processing resources associated with enabled power islands until the workload demand is determined to exceed a threshold. The method can additionally include enabling a disabled power island in response to a determination that the workload demand has exceeded a threshold and separately scaling voltages and frequencies for processing resources associated with different power islands.

One embodiment provides a graphics processor comprising a plurality of dies integrated in a package, at least one die of the plurality of dies functionally heterogeneous relative to at least one other die of the plurality of dies and manufactured with a different process technology than the at least one other die, the plurality of dies including: a graphics compute die comprising a plurality of functional blocks, a first portion of the functional blocks associated with a first clock domain to operate at a first frequency and a second portion of the functional blocks associated with a second clock domain to operate at a second frequency different from the first frequency, the functional blocks including: a plurality of a graphics core blocks, at least one graphics core block comprising a plurality of graphics cores operable at the first frequency, each graphics core comprising: a vector engine to execute vector instructions and perform parallel operations on data elements of vector operands, the data elements stored in vector registers; a matrix accelerator to perform matrix multiplication operations with source matrix data elements, including 16-bit floating point and 8-bit integer matrix data elements; a ray tracing accelerator to perform operations related to ray traversal and intersection; and a shared local memory to store data to be processed by the vector engines, the matrix accelerator, or the ray tracing accelerator; a command processor operable at the second frequency, the command processor to read a command associated with a workload from an in-memory buffer and to responsively identify one or more graphics core blocks of the plurality of graphics core blocks to execute the workload; a plurality of cache dies, each cache die comprising a cache memory to store a portion of the data accessed by one or more of the plurality of graphics core blocks; and a packet-switched interconnect fabric to directly connect the graphics compute die to each of the plurality of cache dies.

The specification and drawings are to be regarded in an illustrative rather than a restrictive sense. Those skilled in the art will appreciate that the broad techniques of the embodiments described herein can be implemented in a variety of forms. Therefore, while the embodiments have been described in connection with examples thereof, the true scope of the embodiments should not be so limited since other modifications will become apparent to the skilled practitioner upon a study of the drawings, specification, and following claims.

What is claimed is:

1. A graphics processor comprising:
   a plurality of dies integrated in a package, at least one die of the plurality of dies functionally heterogeneous relative to at least one other die of the plurality of dies and manufactured with a different process technology than the at least one other die,
   the plurality of dies including:
   a graphics compute die comprising a plurality of functional blocks, a first portion of the functional blocks associated with a first clock domain to operate at a first frequency and a second portion of the functional blocks associated with a second clock domain to operate at a second frequency different from the first frequency, the functional blocks including:
   a plurality of a graphics core blocks, at least one graphics core block comprising a plurality of graphics cores operable at the first frequency, each graphics core comprising:
   a vector engine to execute vector instructions and perform parallel operations on data elements of vector operands, the data elements stored in vector registers;
   a matrix accelerator to perform matrix multiplication operations with source matrix data elements, including 16-bit floating point and 8-bit integer matrix data elements;
   a ray tracing accelerator to perform operations related to ray traversal and intersection; and
   a shared local memory to store data to be processed by the vector engines, the matrix accelerator, or the ray tracing accelerator;
   a command processor operable at the second frequency, the command processor to read a command associated with a workload from an in-memory buffer and to responsively identify one or more graphics core blocks of the plurality of graphics core blocks to execute the workload;
   a plurality of cache dies, each cache die comprising a cache memory to store a portion of the data accessed by one or more of the plurality of graphics core blocks; and
   a packet-switched interconnect fabric to directly connect the graphics compute die to each of the plurality of cache dies.

2. The graphics processor of claim 1 further comprising:
   circuitry to control voltage and clock frequencies provided to each die of the plurality of dies.

3. The graphics processor of claim 2 wherein each die of the plurality of dies comprises one or more separate power islands to supply power in accordance with the voltage and clock frequencies provided to the corresponding die.

4. The graphics processor of claim 3 wherein each graphics core further comprises:
   a set of scalar registers; and
   a scalar logic unit to execute scalar instructions.

5. The graphics processor of claim 4 wherein each graphics core further comprises:
   a cache memory shared by the vector engine, matrix accelerator, and ray tracing accelerator.

6. The graphics processor of claim 1 further comprising:
   circuitry coupled to the command processor, the circuitry to dispatch threads of the workload to the one or more graphics core blocks.

7. The graphics processor of claim 1 wherein the cache memory of each cache die comprises a static random-access memory (SRAM).

8. The graphics processor of claim 7 wherein each cache memory comprises a portion of a distributed global cache.

9. The graphics processor of claim 1 wherein different supply voltages are provided to the first portion of the functional blocks and the second portion of the functional blocks.

10. The graphics processor of claim 1 further comprising:
    a plurality of memory dies to store the data to be accessed by one or more of the plurality of graphics core blocks, each memory die of the plurality of memory dies comprises a dynamic random-access memory (DRAM).

11. The graphics processor of claim 10 wherein each memory die of the plurality of memory dies comprises a graphics double data rate (GDDR) memory.

12. A system comprising:
    a plurality of dies integrated in a package, at least one die of the plurality of dies functionally heterogeneous relative to at least one other die of the plurality of dies and manufactured with a different process technology than the at least one other die, the plurality of dies including:
    a graphics compute die comprising a plurality of functional blocks, a first portion of the functional blocks associated with a first clock domain to operate at a first frequency and a second portion of the functional blocks associated with a second clock domain to operate at a second frequency different from the first frequency, the functional blocks including:
    a plurality of a graphics core blocks, at least one graphics core block comprising a plurality of graphics cores operable at the first frequency, each graphics core comprising:
    a vector engine to execute vector instructions and perform parallel operations on data elements of vector operands, the data elements stored in vector registers;

a matrix accelerator to perform matrix multiplication operations with source matrix data elements, including 16-bit floating point and 8-bit integer matrix data elements;
a ray tracing accelerator to perform operations related to ray traversal and intersection; and
a shared local memory to store data to be processed by the vector engines, the matrix accelerator, or the ray tracing accelerator;
a command processor operable at the second frequency, the command processor to read a command associated with a workload from an in-memory buffer and to responsively identify one or more graphics core blocks of the plurality of graphics core blocks to execute the workload;
a plurality of cache dies, each cache die comprising a cache memory to store a portion of the data accessed by one or more of the plurality of graphics core blocks;
a plurality of memory dies to store the data to be accessed by one or more of the plurality of graphics core blocks, each memory die of the plurality of memory dies comprising a dynamic random access memory (DRAM);
a packet-switched interconnect fabric to directly connect the graphics compute die to each of the plurality of cache dies
a system memory; and
an interconnect to couple the graphics compute die to the system memory.

13. The system of claim 12 wherein each memory die of the plurality of memory dies comprises a graphics double data rate (GDDR) memory.

14. The system of claim 13 further comprising:
a host processor; and
a communication bus to couple the host processor to the package.

15. The system of claim 14 further comprising:
a memory controller integral to the graphics compute die, the memory controller to couple the graphics compute die to the interconnect.

16. The system of claim 15 further comprising:
a data storage device;
a storage interface to couple the data storage device to the host processor and the package; and
a network interface to couple to a network.

17. The system of claim 12 further comprising:
circuitry to control voltage and clock frequencies provided to each die of the plurality of dies.

18. The system of claim 17 wherein each die of the plurality of dies comprises one or more separate power islands to supply power in accordance with the voltage and clock frequencies provided to the corresponding die.

19. The system of claim 18 wherein each graphics core further comprises:
a set of scalar registers; and
a scalar logic unit to execute scalar instructions.

20. The system of claim 19 wherein each graphics core further comprises:
a cache memory shared by the vector engine, matrix accelerator, and ray tracing accelerator.

21. The system of claim 12 further comprising:
circuitry coupled to the command processor, the circuitry to dispatch threads of the workload to the one or more graphics core blocks.

22. The system of claim 12 wherein the cache memory of each cache die comprises a static random-access memory (SRAM).

23. The system of claim 22 wherein each cache memory comprises a portion of a distributed global cache.

24. The system of claim 12 wherein different supply voltages are provided to the first portion of the functional blocks and the second portion of the functional blocks.

* * * * *